(12) United States Patent
Akiyama

(10) Patent No.: US 8,944,606 B2
(45) Date of Patent: Feb. 3, 2015

(54) PROJECTOR HAVING COLOR SEPARATION OPTICAL SYSTEM WITH REFLECTING CURVED SURFACE

(75) Inventor: Koichi Akiyama, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 176 days.

(21) Appl. No.: 13/551,999

(22) Filed: Jul. 18, 2012

(65) Prior Publication Data

US 2013/0033681 A1  Feb. 7, 2013

(30) Foreign Application Priority Data

Aug. 2, 2011   (JP) ................. 2011-169265

(51) Int. Cl.
*G03B 21/00*   (2006.01)
*G02B 13/16*   (2006.01)
*G02B 27/10*   (2006.01)
*G02B 27/14*   (2006.01)
*G03B 21/20*   (2006.01)
*G03B 33/12*   (2006.01)
*H04N 9/31*    (2006.01)

(52) U.S. Cl.
CPC ............. *G02B 13/16* (2013.01); *G02B 27/102* (2013.01); *G02B 27/141* (2013.01); *G03B 21/006* (2013.01); *G03B 21/2026* (2013.01); *G03B 21/208* (2013.01); *G03B 33/12* (2013.01); *H04N 9/3108* (2013.01)
USPC .............................................. 353/31

(58) Field of Classification Search
CPC ... H04N 9/3197; G03B 21/28; G03B 21/2066
USPC ................................. 353/31, 98
See application file for complete search history.

(56) References Cited

U.S. PATENT DOCUMENTS

| | | | |
|---|---|---|---|
| 5,161,042 A | 11/1992 | Hamada | |
| 2003/0063389 A1* | 4/2003 | Koyama | 359/618 |
| 2004/0061837 A1* | 4/2004 | Kodama et al. | 353/31 |
| 2009/0251783 A1* | 10/2009 | Huibers et al. | 359/583 |

FOREIGN PATENT DOCUMENTS

JP   A-04-060538   2/1992

* cited by examiner

*Primary Examiner* — Sultan Chowdhury
*Assistant Examiner* — Danell L Owens
(74) *Attorney, Agent, or Firm* — Oliff PLC

(57) ABSTRACT

A projector includes a light source, a light collection optical system adapted to collect light emitted from the light source, and a light modulation panel adapted to modulate the light collected by the light collection optical system, the light collection optical system includes a color separation optical system adapted to separate the light emitted from the light source into a plurality of types of colored light, and a reflecting curved surface is disposed in at least a light path of the colored light with the longest light path length between the light source and the light modulation panel out of the plurality of types of colored light.

12 Claims, 16 Drawing Sheets

PROJECTOR HAVING COLOR SEPARATION OPTICAL SYSTEM WITH REFLECTING CURVED SURFACE

BACKGROUND

1. Technical Field

The present invention relates to a projector.

2. Related Art

As a projector, there has been known a single-panel projector provided with a single light modulation device. According to the single-panel projector, downsizing and cost reduction of the device can further be achieved compared to a three-panel projector provided with three light modulation devices.

As the single-panel projector, what is disclosed in JP-A-4-60538 (Document 1), for example, can be cited. The projector of Document 1 has an illumination system for separating white light into a plurality of lights with respective wavelengths different from each other, and then emitting the lights. The plurality of lights (e.g., red light, green light, and blue light) with the respective wavelengths thus separated enters the light modulation devices in the state in which the respective light axes are non-parallel to each other. Each of the lights with the respective wavelengths entering the light modulation device is distributed to the pixels corresponding to the light with the corresponding wavelength by a microlens array, and is then modulated.

However, there is caused a difference between the lights with the respective wavelengths thus separated in the light path length between the light source and the light modulation device. Therefore, between the plurality of lights with the respective wavelengths thus separated, the area of the light modulation device which is illuminated by the light is different, and the luminance distribution in the display area of the light modulation element is different. Therefore, an illumination variation occurs.

SUMMARY

An advantage of some aspect of the invention is to provide a projector capable of reducing the illumination variation.

An aspect of the invention is directed to a projector including a light source, a light collection optical system adapted to collect light emitted from the light source, and a light modulation panel adapted to modulate the light collected by the light collection optical system, wherein the light collection optical system includes a color separation optical system adapted to separate the light emitted from the light source into a plurality of types of colored light, and a reflecting curved surface is disposed in at least a light path of the colored light with the longest light path length between the light source and the light modulation panel out of the plurality of types of colored light.

According to this projector, due to the reflecting curved surface having a predetermined curvature, the focal position of the light collection optical system with respect to the colored light with the longest light path length between the light source and the light modulation panel is adjusted. The curvature of the reflecting curved surface is set so that the difference between the area of the region with the roughly uniform luminance distribution of the colored light, which has the longest light path length, and with which the light modulation panel is irradiated, and the area of the display area of the light modulation panel is reduced. Therefore, it becomes possible to equalize the area of the region of the light modulation panel which is illuminated by the colored light between the plurality of types of colored light thus separated, and to equalize the luminance distribution in the display area of the light modulation panel between the plurality of types of colored light thus separated. Therefore, it is possible to provide the projector in which the illumination variation can be reduced.

It should be noted that the "part with the roughly uniform luminance distribution of the light" corresponds to, for example, the flat part at the top of the top-hat shape if the luminance distribution of the light in the light modulation panel has the top-hat shape. Further, the term "roughly uniform" includes the luminance difference too small for the observer to recognize.

The projector according to the above aspect of the invention may be configured such that the color separation optical system includes a first light bundle separation optical system adapted to separate the light emitted from the light source into a first light bundle including first colored light and second colored light, and a second light bundle including third colored light and fourth colored light, a second light bundle separation optical system adapted to separate the first light bundle into the first colored light and the second colored light, and emit the first colored light and the second colored light in respective directions intersecting with a plane including a light axis of the light emitted from the light source and a light axis of the first light bundle, and a third light bundle separation optical system adapted to separate the second light bundle into the third colored light and the fourth colored light, and emit the third colored light and the fourth colored light in respective directions intersecting with the plane, and the reflecting curved surface is disposed in the light path of the colored light with the longest light path length between the light source and the light modulation panel out of the first colored light through the fourth colored light.

In the configuration of separating the light from the light source two-dimensionally into four lights and then emitting the result, the difference in the light path between the colored light with the shortest light path length and the colored light with the longest light path length is larger compared to the configuration of separating the light from the light source one-dimensionally into three lights and then emitting the result. Due to the significant difference in the light path, in the case of, for example, taking the focal position of the light collection optical system with respect to the colored light with the shortest light path length as the reference, the focal position of the light collection optical system with respect to the colored light with the longest light path length is significantly shifted from the reference. Therefore, if the configuration without including the reflecting curved surface is adopted, even if the focal position of the light collection optical system with respect to the colored light with the shortest light path length is adjusted so that the part with the roughly uniform luminance distribution of the colored light with the shortest light path length roughly coincides with the display area of the light modulation panel, the part with the uneven luminance distribution is included in the display area of the light modulation panel regarding the colored light with the longest light path length.

In contrast, according to the projector of this aspect of the invention, it is possible to achieve reduction of the illumination variation in the configuration of separating the light from the light source two-dimensionally into four lights and then emitting the result. For example, in the case of setting the first colored light to the colored light with the shortest light path length, and the fourth colored light to the colored light with the longest light path length, the fourth colored light with the longest light path length is reflected by the reflecting curved surface. The adjustment of the focal position of the light collection optical system with respect to the fourth colored light is performed so as to be different from the focal position of the light collection optical system with respect to the first colored light. Thus, the difference between the area of the region with the roughly uniform luminance distribution of the colored light, which has the longest light path length, and with which the light modulation panel is irradiated, and the area of the display area of the light modulation panel is reduced. Therefore, it is possible to reduce the illumination variation.

The projector according to the above aspect of the invention may be configured such that the first light bundle separation optical system includes a first dichroic mirror adapted to reflect the first light bundle, and transmit the second light bundle, and a first reflecting mirror adapted to reflect the second light bundle, the second light bundle separation optical system includes a second dichroic mirror adapted to reflect the first colored light, and transmit the second colored light, and a second reflecting mirror adapted to reflect the second colored light, the third light bundle separation optical system includes a third dichroic mirror adapted to reflect the third colored light, and transmit the fourth colored light, and a third reflecting mirror adapted to reflect the fourth colored light, and at least one of the first reflecting mirror through the third reflecting mirror is the reflecting curved surface.

According to this configuration, the reduction in illumination variation can be realized with the configuration in which the first through third light bundle separation optical systems each include two types of mirrors, namely the dichroic mirror and the reflecting mirror.

The projector according to the above aspect of the invention may be configured such that the color separation optical system includes a first light bundle separation optical system adapted to separate the light emitted from the light source into a first light bundle including first colored light and second colored light, and a second light bundle including third colored light and fourth colored light, a second light bundle separation optical system adapted to separate the first light bundle into the first colored light and the second colored light, separate the second light bundle into the third colored light and the fourth colored light, and emit the first colored light, the second colored light, the third colored light, and the fourth colored light in respective directions intersecting with a plane including a light axis of the light emitted from the light source and a light axis of the first light bundle, and the reflecting curved surface is disposed in the light path of the colored light with the longest light path length between the light source and the light modulation panel out of the first colored light through the fourth colored light.

According to this configuration, it is possible to achieve reduction of the illumination variation in the configuration of separating the light from the light source two-dimensionally into four lights and then emitting the result. Further, since the projector is configured including the two light bundle separation optical systems, the configuration of the optical system becomes simple compared to the configuration including first through third light bundle separation optical systems. Therefore, downsizing and cost reduction of the projector can be achieved.

The projector according to the above aspect of the invention may be configured such that the first light bundle separation optical system includes a first dichroic mirror adapted to reflect the first light bundle, and transmit the second light bundle, and a first reflecting mirror adapted to reflect the second light bundle, the second light bundle separation optical system includes a second dichroic mirror adapted to reflect the first colored light and the third colored light, and transmit the second colored light and the fourth colored light, and a second reflecting mirror adapted to reflect the second colored light and the fourth colored light, and at least one of the first reflecting mirror and the second reflecting mirror is the reflecting curved surface.

According to this configuration, the reduction in illumination variation can be realized with the configuration in which the first light bundle separation optical system and the second light bundle separation optical system each include two types of mirrors, namely the dichroic mirror and the reflecting mirror. Further, the configuration of the optical system becomes simple compared to the configuration in which the three light bundle separation optical systems each include two types of mirrors, namely the dichroic mirror and the reflecting mirror. Therefore, downsizing and cost reduction of the projector can be achieved.

The projector according to the above aspect of the invention may be configured such that the first light bundle separation optical system includes a light bundle separation element having a first principal surface and a second principal surface opposed to the first principal surface, the first principal surface reflects the first light bundle and transmits the second light bundle, and the second principal surface reflects the second light bundle, and the second principal surface is the reflecting curved surface.

According to this configuration, the first light bundle separation optical system is formed of a single light bundle separation element. Therefore, it is possible to achieve space reduction of the optical system to thereby achieve downsizing of the projector.

In contrast, in the case in which the first light bundle separation optical system is composed of two types of mirrors, namely the dichroic mirror and the reflecting mirror, the number of components increases. Further, in addition to the thickness of the dichroic mirror and the thickness of the reflecting mirror, the dichroic mirror and the reflecting mirror are disposed distantly by a predetermined distance from each other. Therefore, a large space is required.

The projector according to the above aspect of the invention may be configured such that the reflecting curved surface is a convex reflecting curved surface.

According to this configuration, in the configuration of separating the light from the light source two-dimensionally into four lights and then emitting the result, in the case of, for example, setting the first colored light to the colored light with the shortest light path length and the fourth colored light to the colored light with the longest light path length, the fourth colored light with the longest light path length is reflected by the convex surface. The fourth colored light is reflected by the convex surface, and then the light bundle thereof is expanded compared to one before entering the convex surface. Therefore, the size of the area of the light modulation panel which is illuminated by the fourth colored light is increased. Therefore, by adopting the convex surface as the reflecting curved surface, it becomes easy to reduce the difference between the area of the region with the roughly uniform luminance distribution of the colored light, which has the longest light path length, and with which the light modulation panel is irradiated, and the area of the display area of the light modulation panel.

The projector according to the above aspect of the invention may be configured such that the light modulation panel has at least one pixel composed of a plurality of sub-pixels, the light modulation panel is provided with a microlens array disposed on an entrance side of the plurality of types of colored light, and the microlens array is configured so that one microlense constituting the microlens array corresponds to four of the sub-pixels arranged in a 2×2 matrix.

According to this configuration, one microlense constituting the microlens array corresponds one-to-one to the four sub-pixels constituting the pixel. The light separated two-dimensionally into the four lights and then emitted enters a predetermined microlens two-dimensionally in four directions, and is then converged by the microlens, and then transmitted through the pixel of the light modulation panel to thereby be modulated in accordance with the image signal. Therefore, the light efficiency can be improved.

Further, since the sub-pixels are arranged in a 2×2 matrix, the angle formed between the optical axis of the microlens and each of the colored lights entering the microlens is reduced. Therefore, the aberration of the microlens can be reduced.

The projector according to the above aspect of the invention may be configured such that the color separation optical system includes a first dichroic mirror adapted to reflect first colored light, and transmit second colored light and third colored light out of the light emitted from the light source, a second dichroic mirror adapted to reflect the second colored light, and transmit the third colored light, and a reflecting surface adapted to reflect the third colored light, and the reflecting surface is the reflecting curved surface.

In the configuration of separating the light from the light source one-dimensionally into three lights and then emitting the result, in the case of taking the focal position of the light collection optical system with respect to a first colored light with the shortest light path length as the reference, the focal position of the light collection optical system with respect to a third colored light with the longest light path length is shifted from the reference. Therefore, in the case of the configuration without including the reflecting curved surface, the area of the light modulation panel which is illuminated by the colored light is different between the first colored light and the third colored light. Thus, the luminance distribution in the display area of the light modulation panel is different between the first colored light and the third colored light.

In contrast, according to the projector of this configuration, it is possible to achieve reduction of the illumination variation in the configuration of separating the light from the light source one-dimensionally into three lights and then emitting the result. For example, in the case of setting the first colored light to the red light, the second colored light to the green light, and the third colored light to the blue light, the blue light with the longest light path length is reflected by the reflecting curved surface. The adjustment of the focal position of the light collection optical system with respect to the blue light is performed so as to be roughly the same as the focal position of the light collection optical system with respect to the red light with the shortest light path length. Thus, the difference between the area of the region with the roughly uniform luminance distribution of the colored light, which has the longest light path length, and with which the light modulation panel is irradiated, and the area of the display area of the light modulation panel is reduced. As described above, the illumination variation caused by the difference in the light path length between the blue light and the red light can be reduced.

The projector according to the above aspect of the invention may be configured such that the reflecting curved surface is a concave reflecting curved surface.

According to this configuration, the third colored light with the longest light pass length is reflected by the concave surface in the configuration of separating the light from the light source one-dimensionally into the three lights and then emitting the result. The third colored light is reflected by the concave surface, and then the light bundle thereof is converged compared to one before entering the concave surface. Therefore, the size of the area of the light modulation panel which is illuminated by the third colored light is decreased. In the case of taking the focal position of the light collection optical system with respect to the first colored light with the shortest light path length as the reference, although the area of the light modulation panel which is illuminated by the first colored light is set to be smaller, the area of the light modulation panel which is illuminated by the third colored light is also set to be smaller, and therefore, the area illuminated by the first colored light and the area illuminated by the third colored light become roughly equal to each other. Therefore, by adopting the concave surface as the reflecting curved surface, it becomes easy to adjust the focal position of the light collection optical system with respect to the third colored light so as to roughly coincide with the focal position of the light collection optical system with respect to the first colored light. Thus, it becomes easy to reduce the difference between the area of the region with the roughly uniform luminance distribution of the colored light, which has the longest light path length, and with which the light modulation panel is irradiated, and the area of the display area of the light modulation panel.

The projector according to the above aspect of the invention may be configured such that the light modulation panel has at least one pixel composed of a plurality of sub-pixels, the light modulation panel is provided with a microlens array disposed on an entrance side of the plurality of types of colored light, and the microlens array is configured so that one microlense constituting the microlens array corresponds to three of the sub-pixels.

According to this configuration, one microlense constituting the microlens array corresponds one-to-one to the three sub-pixels constituting the pixel. The light separated one-dimensionally into the three lights and then emitted enters a predetermined microlens in three directions, and is then converged by the microlens, and then transmitted through the pixel of the light modulation panel to thereby be modulated in accordance with the image signal. Therefore, the light efficiency can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
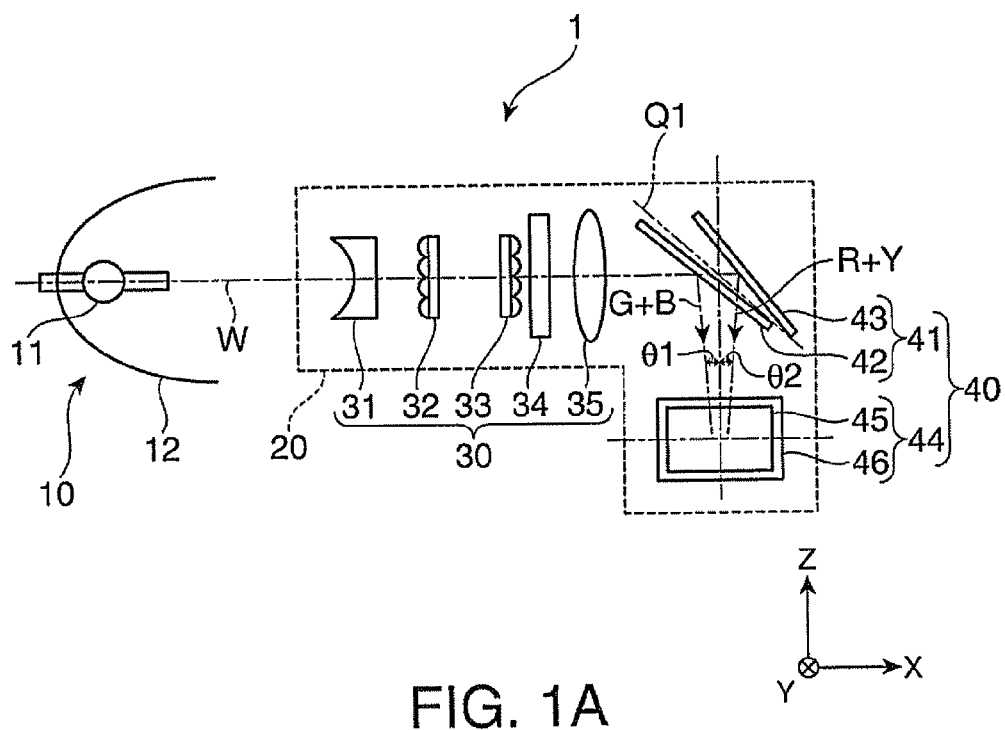
FIGS. 1A and 1B are schematic diagrams showing a projector according to a first embodiment of the invention.

Hereinafter, some embodiments of the invention will be described with reference to the accompanying drawings. The embodiments each show an aspect of the invention, but do not limit the scope of the invention, and can arbitrarily be modified within a technical concept of the invention. Further, in the drawings explained hereinafter, in order for making each constituent easy to understand, the actual structures and the structures of the drawings are made different from each other in scale size, number, and so on.

First Embodiment

A projector as an embodiment of the invention will be explained with reference to FIGS. 1A, 1B, 2, 3, 4A, 4B, 5 through 7, 8A, 8B, 9A, 9B, 10, and 11.

In the present embodiment, a projector 1 will be explained citing a projection type projector for projecting colored lights, which include image information, and are generated by a light modulation panel, on a screen (a projection target surface) via a projection optical system as an example.

It should be noted that in the following explanation, an XYZ Cartesian coordinate system is defined if necessary, and positional relationships between the respective members will be explained with reference to the XYZ Cartesian coordinate system. In the present embodiment, the direction parallel to the light axis of the light emitted from the light source 10 is defined as the X direction, and the two directions perpendicular to the X direction are defined as the Y direction and the Z direction, respectively.

Figure 1B:
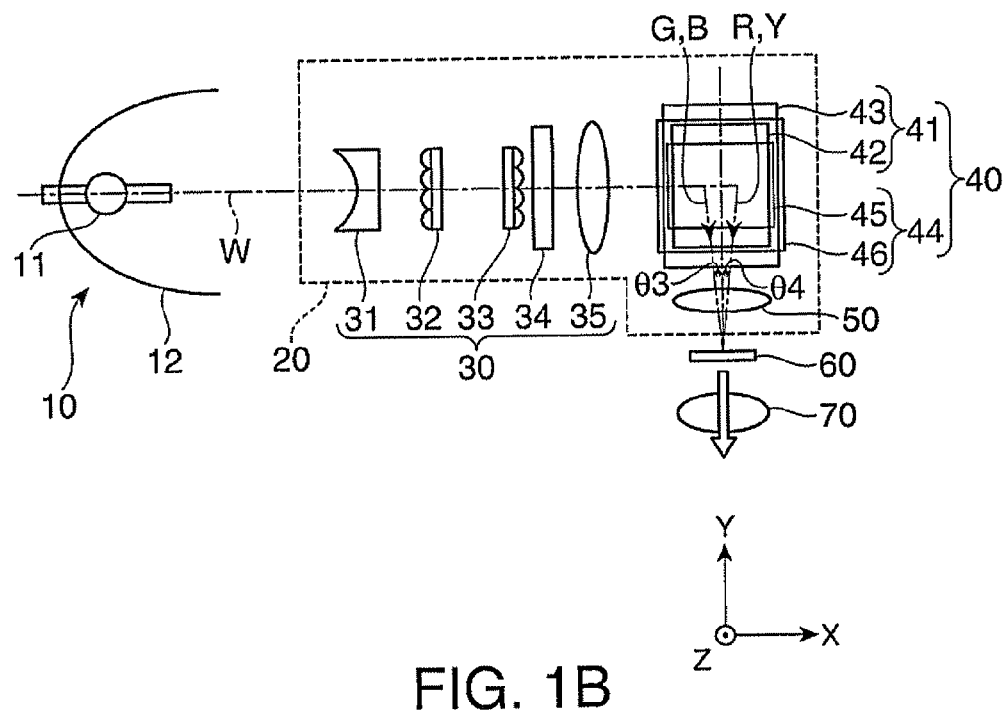

FIGS. 1A and 1B are diagrams showing a schematic configuration of the projector 1 according to the present embodiment. FIG. 1A is a side view of the projector 1, and FIG. 1B is a plan view of the projector 1. As shown in FIGS. 1A and 1B, the projector 1 is provided with a light source 10 for emitting light W including visible light, a light collection optical system 20 for collecting the light W emitted from the light source 10, a light modulation panel 60 for modulating the light collected by the light collection optical system 20, and a projection optical system (a projection lens) for projecting colored lights generated by the light modulation panel 60 and including image information on a screen (not shown). It should be noted that the light modulation panel 60 is, for example, a liquid crystal panel.

The light source 10 is provided with a light source lamp 11 for radially emitting the light, and a reflector 12 for emitting the light, which is radiated by the light source lamp 11, toward one direction (+X direction). It should be noted that as the light source lamp 11, there can be used a high-pressure mercury lamp, a metal halide lamp, a halogen lamp, a xenon lamp, and so on, and as the reflector 12 there can be used a paraboloidal reflector, a ellipsoidal reflector, a spherical reflector, and so on.

The light collection optical system 20 is provided with a polarization conversion optical system 30 for converting the unpolarized light emitted from the light source 10 into the light with one polarization state, a color separation optical system 40 for separating the light emitted from the polarization conversion optical system 30 into a plurality of types of colored light, and a field lens 50 for roughly collimating the colored lights from the color separation optical system 40 and then emitting the result.

The polarization conversion optical system 30 is provided with a concave lens 31 for roughly collimating the light W emitted from the light source 10 and then emitting the result, a first lens array 32 having a plurality of first small lenses for dividing the light emitted from the concave lens 31 into a plurality of partial light bundles, a second lens array 33 having a plurality of second small lenses corresponding to the plurality of first small lenses of the first lens array 32, a polarization beam splitter array (a polarization splitter element) 34 for polarization-converting each of the partial light bundles from the second lens array 33 into a light having the first polarization component (e.g., p-polarized light) and then emitting the result, and an overlapping lens 35 for overlapping the partial light bundles from the polarization beam splitter array 34 with each other on the light modulation panel 60.

Figure 2:
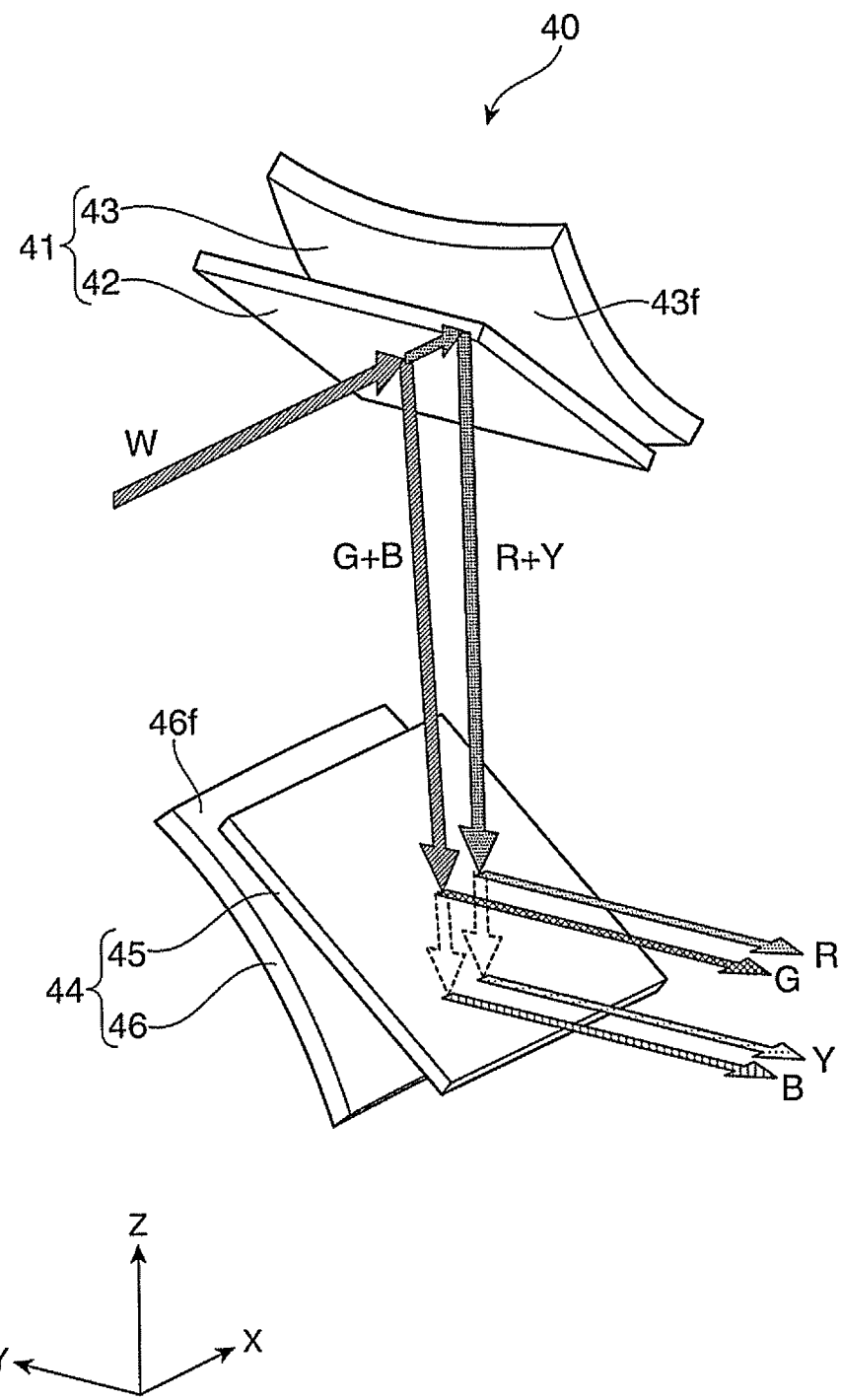
FIG. 2 is a perspective view showing a color separation optical system of the first embodiment.

FIG. 2 is a perspective view showing the color separation optical system 40 of the present embodiment.

As shown in FIG. 2, the color separation optical system 40 is provided with a first light bundle separation optical system 41, and a second light bundle separation optical system 44. The first light bundle separation optical system 41 separates the light W (white light) emitted from the light source 10 into a first light bundle (G+B) and a second light bundle (R+Y). The first light bundle (G+B) includes first colored light (green light G) and second colored light (blue light B) and the second light bundle (R+Y) includes third colored light (red light R) and fourth colored light (yellow light Y). Here, the light axis direction of the light W emitted from the light source 10 is defined as the X axis direction, and the XYZ coordinate system is defined so that the plane including the light axis of the light W emitted from the light source 10 and the light axis of the first light bundle (G+B) corresponds to the X-Z plane.

The second light bundle separation optical system 44 separates the first light bundle (G+B) into the first colored light (the green light G) and the second colored light (the blue light B), and then emits the first colored light (the green light G) and the second colored light (the blue light B) toward the direction intersecting with the X-Z plane. Further, the second light bundle separation optical system 44 separates the second light bundle (R+Y) into the third colored light (the red light R) and the fourth colored light (the yellow light Y), and then emits the third colored light (the red light R) and the fourth colored light (the yellow light Y) toward the direction intersecting with the X-Z plane.

Figure 3:
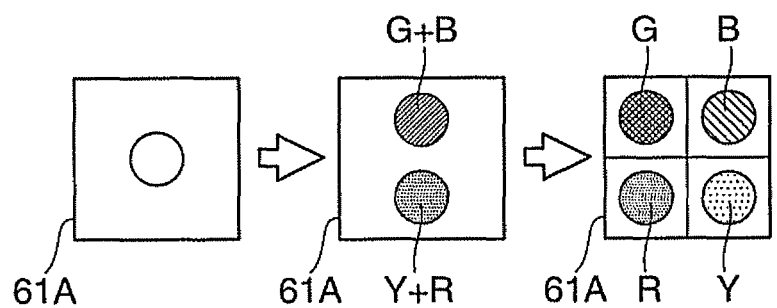
FIG. 3 is a schematic diagram showing how the color separation is performed in the first embodiment.

Here, although it is assumed that the blue light B in FIGS. 2 and 3 is the light in a wavelength band of about 380 nm through 520 nm, the green light G is the light in a wavelength band of about 520 nm through 560 nm, the yellow light is the light in a wavelength band of about 560 nm through 600 nm, and the red light R is the light in a wavelength band of about 600 nm through 780 nm, the invention is not limited thereto.

In general, the human visual sensitivity with respect to the green light is high. Taking the fact that the green light significantly affects the feeling of fineness in appreciation into consideration, it is preferable to divide the green light into two wavelength bands and modulate them independently of each other. In the present embodiment, it is defined that the green light (the bluish green light) on the short wavelength side, namely the light in the wavelength band of 520 nm through 560 nm, is the green light G, and the green light (the yellowish green light) on the long wavelength side, namely the light in the wavelength band of 560 nm through 600 nm, is the yellow light Y. By modulating the green light G and the yellow light Y independently, expansion of the color representation gamut and improvement in the feeling of fineness in viewing are achieved.

The first light bundle separation optical system 41 is provided with a first dichroic mirror 42 and a first reflecting mirror 43. The first dichroic mirror 42 is a mirror for reflecting the first light bundle (G+B) and at the same time transmitting the second light bundle (R+Y). The first reflecting mirror 43 is a mirror for reflecting the second light bundle (R+Y).

The second light bundle separation optical system 44 is provided with a second dichroic mirror 45 and a second reflecting mirror 46. The second dichroic mirror 45 is a mirror for reflecting the green light G and the red light R, and at the same time transmitting the blue light B and the yellow light Y. The second reflecting mirror 46 is a mirror for reflecting the blue light B and the yellow light Y.

The first dichroic mirror 42 and the first reflecting mirror 43 are arranged so that the incident angle of the light W emitted from the light source 10 to the first dichroic mirror 42 is different from the incident angle of the light W emitted from the light source 10 to the first reflecting mirror 43. For example, when setting an imaginary axis Q1 forming an angle of 45° with the X axis in the X-Z plane as shown in FIG. 1A, the first dichroic mirror 42 is tilted with respect to the first reflecting mirror 43 symmetrically about the axis Q1. In FIG. 1A, the first dichroic mirror 42 and the first reflecting mirror 43 are arranged so that the further a position on the X-Z plane proceeds toward the +X direction or toward the −Z direction, the narrower the distance between the first dichroic mirror 42 and the first reflecting mirror 43 at the position is.

Therefore, the first light bundle (G+B) reflected by the first dichroic mirror 42 and the second light bundle (R+Y) reflected by the first reflecting mirror 43 are respectively emitted in two directions slightly different from each other on the X-Z plane. For example, the first dichroic mirror 42 is disposed so that the first light bundle (G+B) reflected by the first dichroic mirror 42 forms an angle of 7° with respect to the Z axis ($\theta 1 = 7°$ shown in FIG. 1A). The first reflecting mirror 43 is disposed so that the second light bundle (R+Y) reflected by the first reflecting mirror 43 forms an angle of 7° with respect to the Z axis ($\theta 2 = 7°$ shown in FIG. 1A).

The second dichroic mirror 45 and the second reflecting mirror 46 are arranged so that the incident angle of the first light bundle (G+B) to the second dichroic mirror 45 is different from the incident angle of the first light bundle (G+B) to the second reflecting mirror 46. Further, the incident angle of the second light bundle (R+Y) to the second dichroic mirror 45 is different from the incident angle of the second light bundle (R+Y) to the second reflecting mirror 46. For example, when setting an imaginary axis Q2 not shown, the second dichroic mirror 45 is tilted with respect to the second reflecting mirror 46 symmetrically about the axis Q2.

Therefore, the green light G, the red light R, the blue light B, and the yellow light Y are emitted in the respective directions slightly different from each other. For example, the second dichroic mirror 45 is disposed so that the green light G and the red light R reflected by the second dichroic mirror 45 form an angle of 7° with respect to the Y axis ($\theta 3 = 7°$ shown in FIG. 1B). The second reflecting mirror 46 is disposed so that the blue light B and the yellow light Y reflected by the second reflecting mirror 46 form an angle of 7° with respect to the Y axis ($\theta 4 = 7°$ shown in FIG. 1B). Thus, the green light G, the red light R, the blue light B, and the yellow light Y enter the light modulation panel 60 at the respective angles different from each other.

FIG. 3 is a schematic diagram showing how the color separation is performed in the color separation optical system 40 of the present embodiment.

For the sake of convenience, FIG. 3 shows how the color separation corresponding to a microlens 61A, one of the plurality of microlenses constituting the microlens array, is performed.

As shown in FIG. 3, the light W (white light) emitted from the light source 10 is separated by the first light bundle separation optical system 41 into the first light bundle G+B and the second light bundle R+Y. Further, the first light bundle G+B and the second light bundle R+Y are separated by the second light bundle separation optical system 44 into the green light G, the blue light B, the red light R, and the yellow light Y.

Incidentally, in the configuration of separating the light from the light source two-dimensionally into the four lights and then emitting the four lights by the first light bundle separation optical system 41 and the second light bundle separation optical system 44 described above, the difference in the light path between the colored light with the shortest light path length and the colored light with the longest light path length is larger compared to the configuration of separating the light from the light source one-dimensionally into three lights as shown in, for example, Document 1. Due to the significant difference in the light path, in the case of, for example, taking the focal position of the light collection optical system with respect to the colored light with the shortest light path length as the reference position, the focal position of the light collection optical system with respect to the colored light with the longest light path length is significantly shifted from the reference position.

Figure 7:
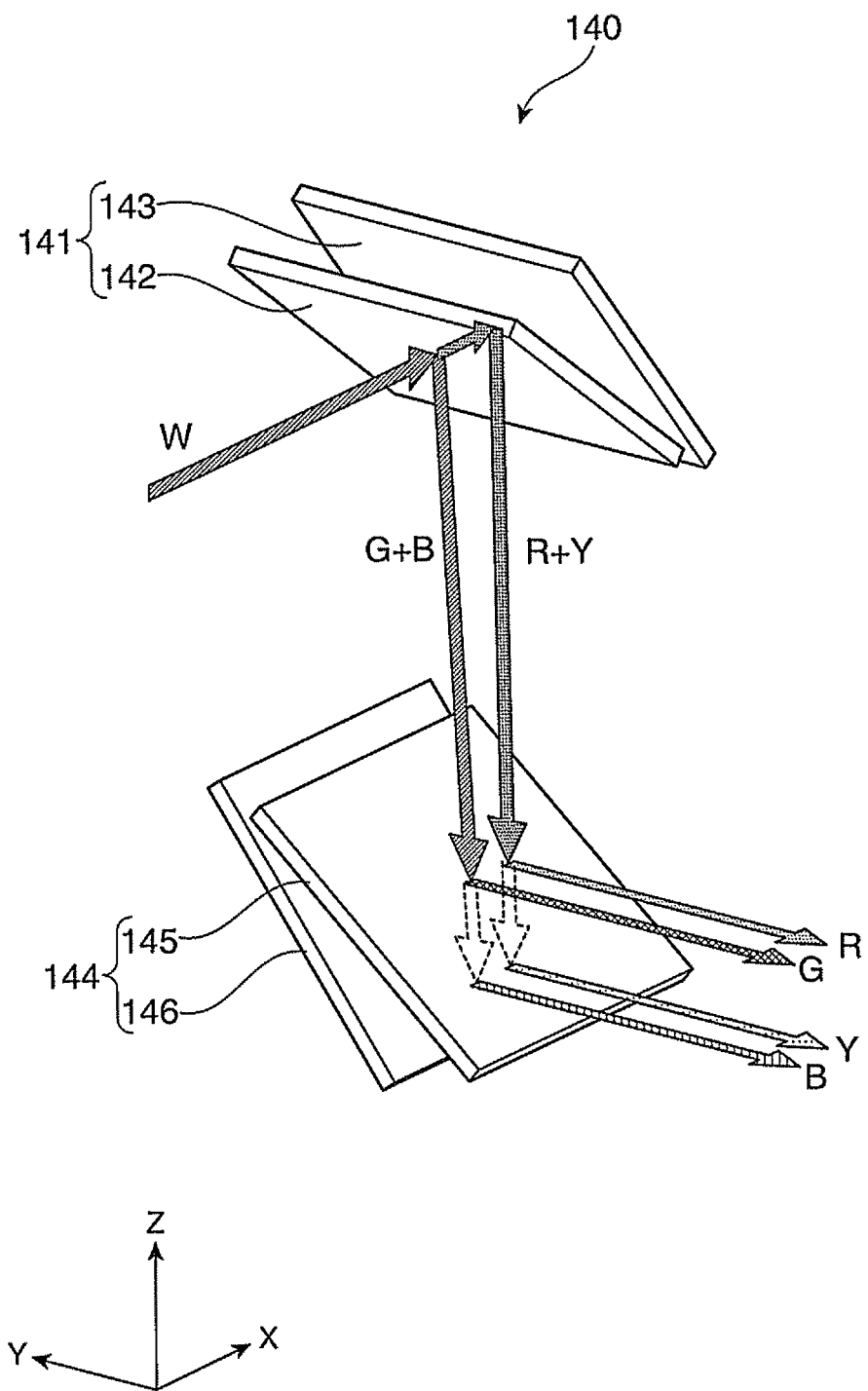
FIG. 7 is a perspective view showing a color separation optical system of a comparative example.

FIG. 7 is a perspective view showing a color separation optical system 140 of a comparative example corresponding to FIG. 2. In FIG. 7, the reference numeral 141 denotes the first light bundle separation optical system, the reference numeral 142 denotes the first dichroic mirror, the reference numeral 143 denotes the first reflecting mirror, the reference numeral 144 denotes the second light bundle separation optical system, the reference numeral 145 denotes the second dichroic mirror, and the reference numeral 146 denotes the second reflecting mirror.

The first dichroic mirror 142 is a mirror for reflecting the first light bundle (G+B) and at the same time transmitting the second light bundle (R+Y). The first reflecting mirror 143 is a mirror for reflecting the second light bundle (R+Y).

The second dichroic mirror 145 is a mirror for reflecting the green light G and the red light R, and at the same time transmitting the blue light B and the yellow light Y. The second reflecting mirror 146 is a mirror for reflecting the blue light B and the yellow light Y.

The light W emitted from the light source (not shown) is separated by the first light bundle separation optical system 141 and the second light bundle separation optical system 144 into four types of colored light (the green light G, the blue light B, the red light R, and the yellow light Y), and then emitted toward the light modulation panel (not shown).

Among these four types of colored light, the colored light with the shortest light path length between the light source and the light modulation panel is the colored light (the colored light not transmitted through the first dichroic mirror 142 and the second dichroic mirror 145) reflected by the first dichroic mirror 142 and the second dichroic mirror 145. In contrast, the colored light with the longest light path length between the light source and the light modulation panel is the colored light (the colored light transmitted through the first dichroic mirror 142 and the second dichroic mirror 145) reflected by the first reflecting mirror 143 and the second reflecting mirror 146.

In the example shown in FIG. 7, the colored light with the shortest light path length is the green light G, and the colored light with the longest light path length is the yellow light Y.

Figure 8A:
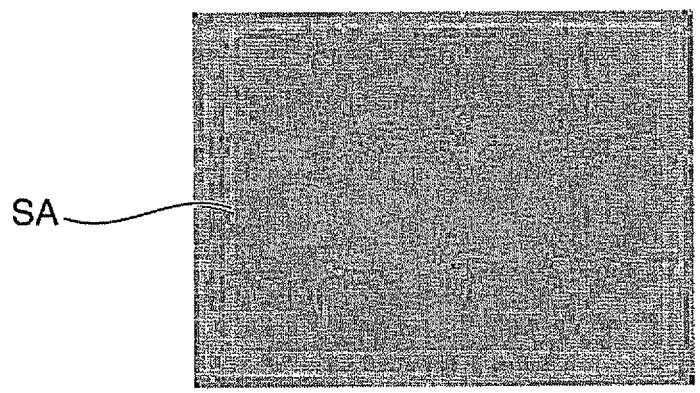
FIGS. 8A and 8B are diagrams showing an illumination area with respect to a light modulation panel when using the color separation optical system of the comparative example.
Figure 8B:
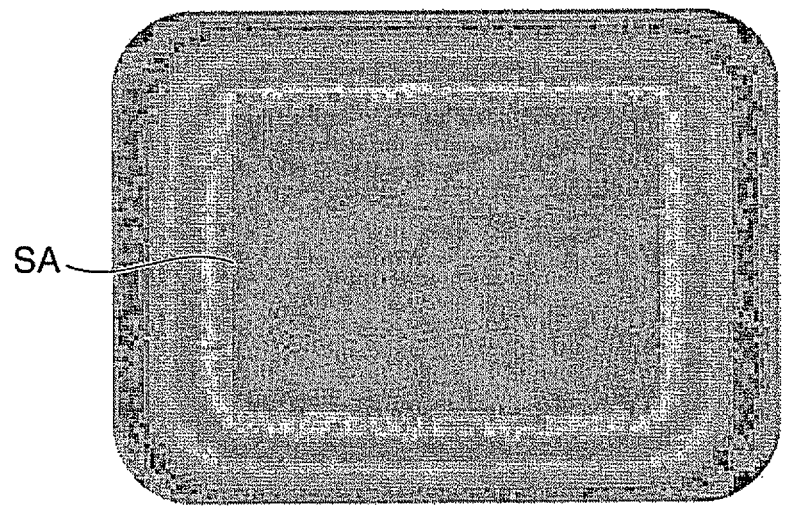

FIGS. 8A and 8B are diagrams showing an illumination area with respect to the light modulation panel when using the color separation optical system 140 of the comparative example. FIGS. 8A and 8B show the difference in illumination margin due to the difference in the light path length, wherein FIG. 8A shows the illumination area of the colored light (e.g., the green light G) with the shortest light path length, and FIG. 8B shows the illumination area of the colored light (e.g., the yellow light Y) with the longest light path length. In FIGS. 8A and 8B, the reference symbol SA denotes the display area of the light modulation panel.

Figure 9A:
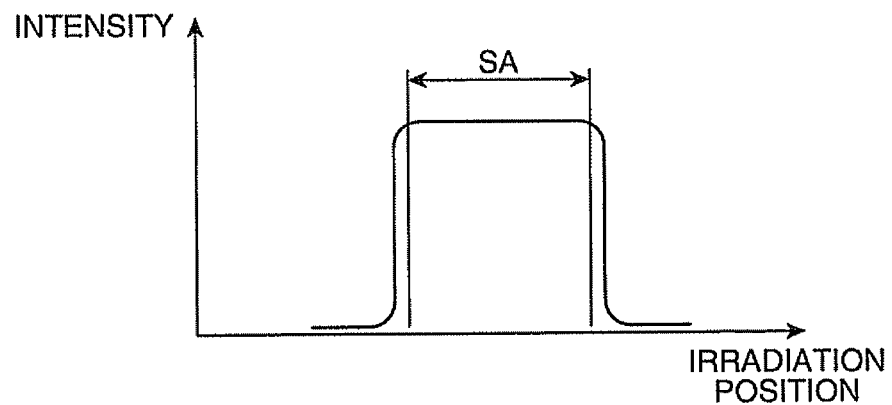
FIGS. 9A and 9B are diagrams showing the light intensity distributions of the light emitted from the color separation optical system of the comparative example.
Figure 9B:
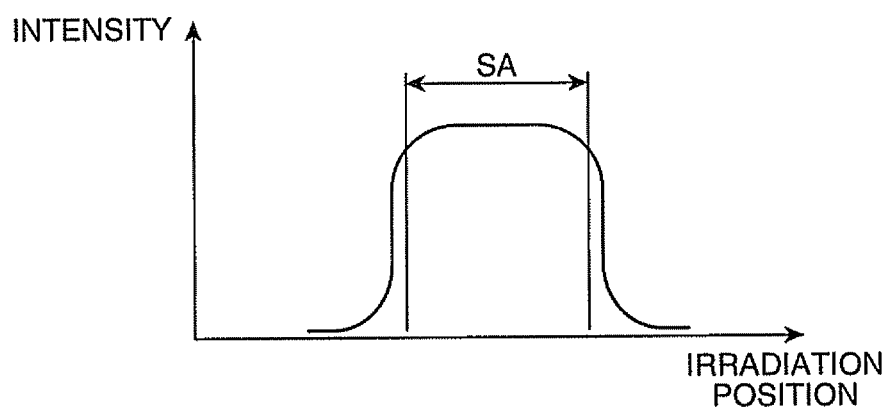

FIGS. 9A and 9B are diagrams showing the light intensity distributions of the light emitted from the color separation optical system 140 of the comparative example. FIG. 9A shows the light intensity distribution of the colored light (e.g., the green light G) with the shortest light path length, and FIG. 9B shows the light intensity distribution of the colored light (e.g., the yellow light Y) with the longest light path length.

As shown in FIG. 8A, it is assumed that the focal position of the light collection optical system 20 with respect to the green light G is adjusted so that the display area SA of the light modulation panel is included in the part where no variation occurs in the luminance distribution of the colored light (the green light G) with the shortest light path length. The part where no variation occurs in the luminance distribution of the light denotes the part with the roughly uniform luminance distribution of the light. For example, in the case in which the luminance distribution of the light in the light modulation panel has a top-hat shape (also referred to as a flat-top shape), the flat part at the top of the top-hat shape corresponds to the part with the roughly uniform luminance distribution of the light. Further, the term "roughly uniform" includes the luminance difference too small for the observer to recognize.

It should be noted that a predetermined proportion of the light having the luminance distribution of the top-hat shape illuminates the inside of the display area SA. For example, 48.66% of the colored light (e.g., the green light G) with the shortest light path length illuminates the inside of the display area SA.

As shown in FIG. 9A, the luminance distribution of the colored light (e.g., the green light G) with the shortest light path length has the top-hat shape. The flat part at the top of the top-hat shape has the roughly uniform intensity distribution (luminance distribution). Regarding the colored light (e.g., the green light G) with the shortest light path length, the display area SA is included in the part with the roughly uniform luminance distribution, and the part with the uneven luminance distribution is not included in the display area SA.

On the other hand, as shown in FIG. 8B, regarding the colored light (e.g., the yellow light Y) with the longest light path length, the part with the uneven luminance distribution is included in the display area SA of the light modulation panel.

Here, in the configuration of separating the light from the light source two-dimensionally into four lights and then emitting the result as in the present embodiment, the color separation optical system includes a plurality of (two) light bundle separation optical systems. Therefore, the light from the light source is reflected at least two times in the process of being guided by the color separation optical system.

In contrast, in the configuration of separating the light from the light source one-dimensionally into three lights and then emitting the result as in Document 1, the color separation optical system is composed of two dichroic mirrors and one reflecting mirror. Therefore, the number of times of reflection of the light from the light source in the process of being guided by the color separation optical system is one.

Therefore, in the case of the configuration of separating the light from the light source two-dimensionally into four lights and then emitting the result, the difference in the light path between the colored light with the shortest light path length and the colored light with the longest light path length is significant compared to the configuration of separating the light from the light source one-dimensionally into three lights and then emitting the result.

As described above, the fact that the part with the uneven luminance distribution of the colored light (e.g., the yellow light Y) with the longest light path length is included in the display area SA of the light modulation panel in the configuration of separating the light from the light source two-dimensionally into four lights and then emitting the result, is due to the fact that the difference in the light path between the colored light with the shortest light path and the colored light with the longest light path is significant compared to the configuration of separating the light from the light source one-dimensionally into three lights and then emitting the result.

It should be noted that a predetermined proportion of the colored light (e.g., the yellow light Y) with the longest light path length illuminates the inside of the display area SA. For example, 40.31% of the colored light (e.g., the yellow light Y) with the longest light path length illuminates the inside of the display area SA.

As shown in FIG. 9B, the luminance distribution of the colored light (e.g., the yellow light Y) with the longest light path length has the shape with a smaller flat part at the top and gentler edges compared to the top-hat shape shown in FIG. 9A. Regarding the colored light (e.g., the yellow light Y) with the longest light path length, the display area SA includes not only the part with the roughly uniform luminance distribution, but also the part with the uneven luminance distribution.

As described above, in the case of using the color separation optical system 140 of the comparative example, even if the focal position of the light collection optical system 20 with respect to the green light G is adjusted so that the part with the roughly uniform luminance distribution of the colored light (e.g., the green light G) with the shortest light path length roughly coincides with the display area SA of the light modulation panel, the part with the uneven luminance distribution is included in the display area SA of the light modulation panel regarding the colored light (e.g., the yellow light Y) with the longest light path length due to the difference in illumination margin caused by the difference in the light path length. Therefore, there occurs such a difference in the luminance distribution (the illumination variation) that the center portion of the display area SA of the light modulation panel is bright while the peripheral portion is dark.

Therefore, in the present embodiment, reflecting curved surfaces are disposed in the light path of at least the colored light with the longest light path length between the light source and the light modulation panel out of the plurality of types of colored light. The reflecting curved surfaces adjust the focal position of the light collection optical system with respect to the colored light using the curvatures of themselves.

Specifically, as shown in FIG. 2, in the color separation optical system 40, a reflecting curved surface 43*f* and a reflecting curved surface 46*f* are disposed in the light path of the colored light (the yellow light Y) with the longest light path length between the light source 10 and the light modulation panel 60 out of the green light G, the red light R, the blue light B, and the yellow light Y.

The reflecting curved surface 43*f* and the reflecting curved surface 46*f* have a function of reducing the difference in the focal position of the light collection optical system 20 due to the difference in the light path length.

In the present embodiment, the first reflecting mirror 43 is provided with the reflecting curved surface 43*f*, and the second reflecting mirror 46 is also provided with the reflecting curved surface 46*f*. Both of the reflecting curved surface 43*f* of the first reflecting mirror 43 and the reflecting curved surface 46*f* of the second reflecting mirror 46 are formed to have a convex surface on the side of reflecting the light.

Figure 5:
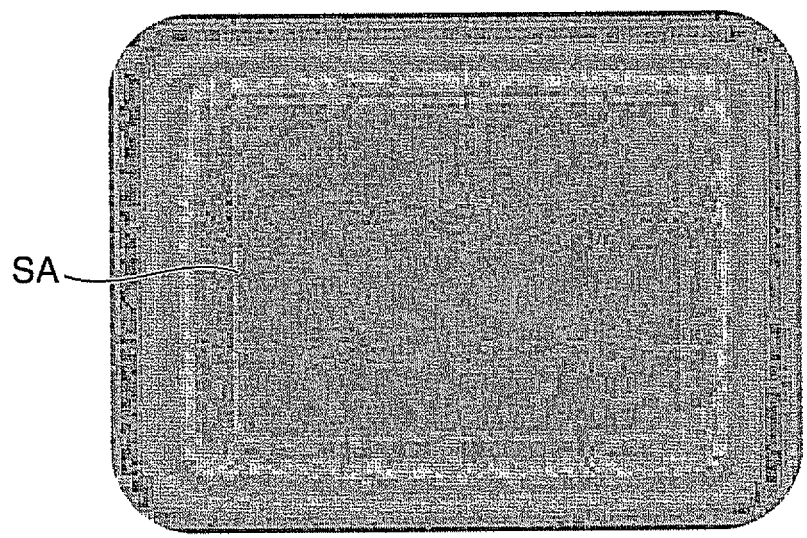
FIG. 5 is a diagram showing an illumination area with respect to a light modulation panel when using the color separation optical system of the first embodiment.

FIG. 5 is a diagram showing an illumination area with respect to the light modulation panel when using the color separation optical system 40 of the present embodiment. FIG. 5 shows the illumination area of the colored light (e.g., the yellow light Y) with the longest light path length corresponding to FIG. 8B. In FIG. 5, the reference symbol SA denotes the display area of the light modulation panel.

Figure 6:
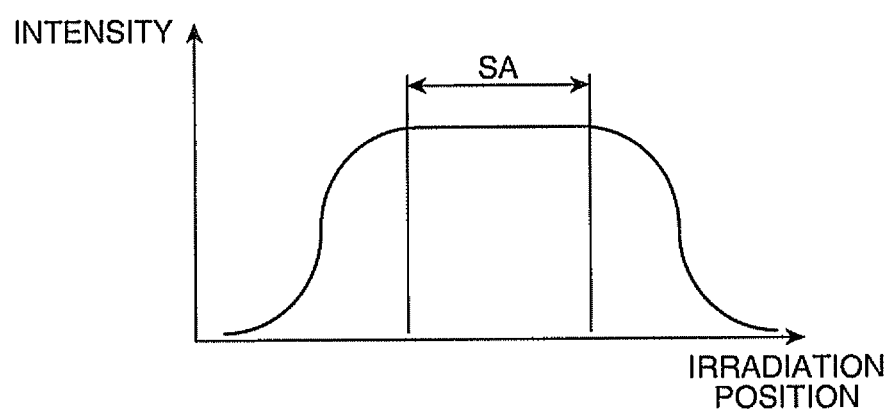
FIG. 6 is a diagram showing the light intensity distribution of the light emitted from the color separation optical system of the first embodiment.

FIG. 6 is a diagram showing the light intensity distribution of the light emitted from the color separation optical system 40 of the present embodiment. FIG. 6 shows the light intensity distribution of the colored light (e.g., the yellow light Y) with the longest light path length corresponding to FIG. 9B.

In the case of using the color separation optical system 40 of the present embodiment, as shown in FIG. 5, it is also possible to arrange that the display area SA of the light modulation panel is included in the part with the roughly uniform luminance distribution with respect to the colored light (the yellow light Y) with the longest light path length. In the present embodiment, the fourth colored light Y with the longest light path length is reflected by the reflecting curved surface 43*f* and the reflecting curved surface 46*f*. By adjusting the curvature of the reflecting curved surface 43*f* and the curvature of the reflecting curved surface 46*f*, it is possible to make the focal position of the light collection optical system with respect to the yellow light Y and the focal position of the light collection optical system with respect to the green light G different from each other. Specifically, the light bundle is reflected by the reflecting curved surface formed of a convex surface to thereby be expanded. Therefore, the yellow light Y is reflected by the reflecting curved surface 43*f* and is then reflected by the reflecting curved surface 46*f* to thereby expand the light bundle of the yellow light Y. Therefore, the size of the area of the light modulation panel which is illuminated by the yellow light Y is increased. Thus, regarding the colored light (the yellow light Y) with the longest light path length, it is possible to arrange that the display area SA of the light modulation panel is included in the part with the roughly uniform luminance distribution.

It should be noted that in the present embodiment, 37.31% of the colored light (e.g., the yellow light Y) with the longest light path length illuminates the inside of the display area SA.

As shown in FIG. 6, although the luminance distribution of the colored light (e.g., the yellow light Y) with the longest light path length has the shape with gentler edges similar to the shape shown in FIG. 9B, the area of the flat part at the top is larger. Regarding the colored light (e.g., the yellow light Y) with the longest light path length, the display area SA is included in the part with the roughly uniform luminance distribution, and the part with the uneven luminance distribution is not included in the display area SA.

As described above, in the case of using the color separation optical system 40 of the present embodiment, even if the focal position of the light collection optical system 20 with respect to the colored light (e.g., the green light G) with the shortest light path length is adjusted so that the part with the roughly uniform luminance distribution of the colored light (e.g., the green light G) with the shortest light path length roughly coincides with the display area SA of the light modulation panel, it is possible to arrange that the part with the uneven luminance distribution is not included in the display area SA of the light modulation panel regarding the colored light (e.g., the yellow light Y) with the longest light path length. Alternatively, it is possible to reduce the proportion of a part, which is included in the display area SA of the light modulation panel, in the part with the uneven luminance distribution. As described above, it is possible to reduce the difference between the area of the region with the roughly uniform luminance distribution of the colored light (e.g., the yellow light Y), which has the longest light path length, and with which the light modulation panel is irradiated, and the area of the display area SA of the light modulation panel. Therefore, a bright image with a uniform luminance distribution can be obtained in the entire display area SA of the light modulation panel.

Going back to FIG. 1B, the colored light separated into by the color separation optical system 40 is emitted toward the light modulation panel 60 in the state of being collimated by the field lens 50.

Figure 4A:
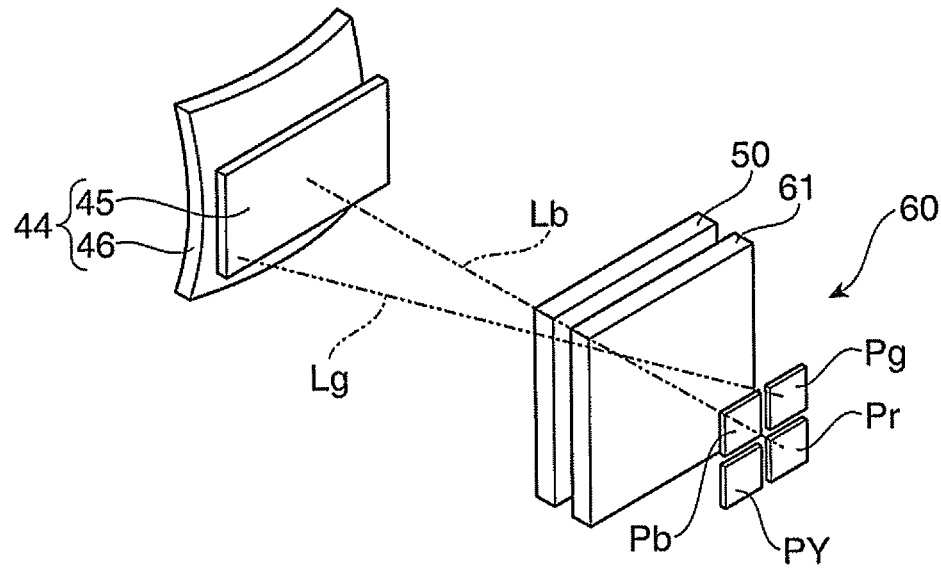
FIGS. 4A and 4B are diagrams for explaining the correspondence relationship between a microlens and sub-pixels in the first embodiment.
Figure 4B:
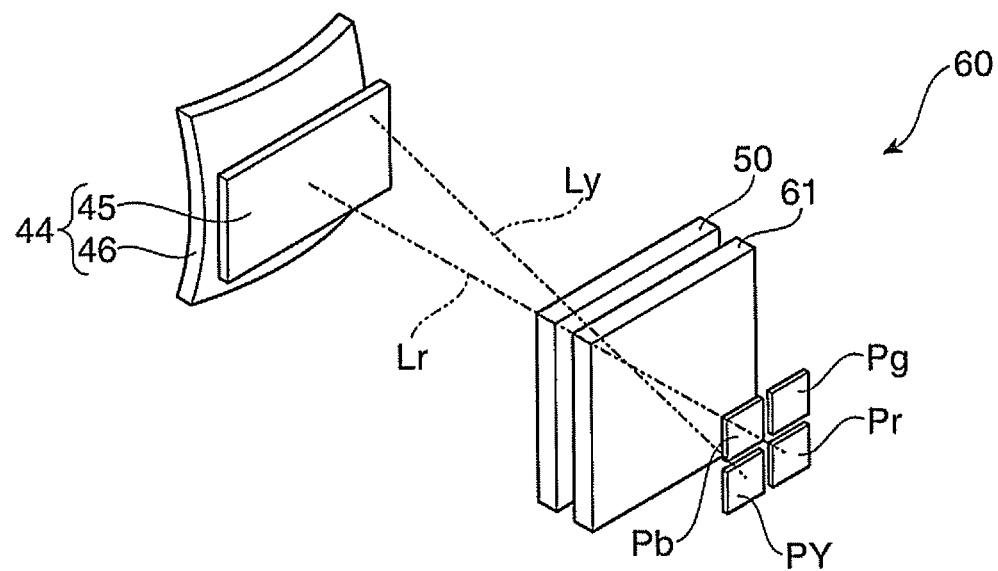

FIGS. 4A and 4B are diagrams for explaining the correspondence relationship between the microlens and the sub-pixels provided to the light modulation panel 60 of the present embodiment. In FIGS. 4A and 4B, the case of guiding the green light G and the blue light B out of the four types of colored light is shown in FIG. 4A, and the case of guiding the red light R and the yellow light Y is shown in FIG. 4B for the sake of convenience. Further, only the pixels and the microlens array 61 constituting the light modulation panel 60 are shown, and the other constituents are omitted from the drawings for the sake of convenience. Further, a pixel P, one of the plurality of pixels constituting the light modulation panel 60, is only shown in the drawings. The pixel P is composed of a sub-pixel Pr, a sub-pixel Pg, a sub-pixel Pb, and a sub-pixel Py. The sub-pixel Pr, the sub-pixel Pg, the sub-pixel Pb, and the sub-pixel Py are arranged two-dimensionally in a 2×2 matrix. In FIG. 4A, the reference symbol Lg denotes the incident light axis of the green light G to the green sub-pixel Pg, and the reference symbol Lb denotes the incident light axis of the blue light B to the blue sub-pixel Pb. In FIG. 4B, the reference symbol Lr denotes the incident light axis of the red light R to the red sub-pixel Pr, and the reference symbol Ly denotes the incident light axis of the yellow light Y to the yellow sub-pixel Py.

As shown in FIGS. 4A and 4B, each of the colored light Lg, the colored light Lb, the colored light Lr, and the colored light Ly is collimated by the field lens 50, and then enters the light modulation panel 60. The colored light Lg, the colored light Lb, the colored light Lr, and the colored light Ly entering the light modulation panel 60 are nonparallel to each other.

The sub-pixel Pg corresponds to the first colored light Lg, the sub-pixel Pb corresponds to the second colored light Lb, the sub-pixel Pr corresponds to the third colored light Lr, and the sub-pixel Py corresponds to the fourth colored light Ly. The colored light Lg, the colored light Lb, the colored light Lr, and the colored light Ly having entered the light modulation panel 60 are each collected by the microlens array 61, and then enter the corresponding sub-pixels.

As shown in FIG. 3, the microlens array 61 is configured so as to have microlenses 61A each corresponding to four sub-pixels arranged in a 2×2 matrix. The colored light Lg, the colored light Lb, the colored light Lr, and the colored light Ly are modulated independently of each other, and are then emitted from the light modulation panel 60. The lights emitted from the light modulation panel 60 are projected on a screen (not shown) by the projection lens 70 shown in FIG. 1B in an enlarged manner.

According to the projector 1 of the present embodiment, the focal position of the light collection optical system 20 with respect to the colored light with the longest light path between the light source 10 and the light modulation panel 60 is adjusted using the reflecting curved surface 43f having a predetermined curvature and the reflecting curved surface 46f having a predetermined curvature. For example, the focal position of the light collection optical system 20 with respect to the colored light is adjusted so that the part with the uneven luminance distribution of the colored light is not included in the display area SA of the light modulation panel, or so that the proportion of a part, which is included in the display area SA of the light modulation panel, in the part with the uneven luminance distribution of the colored light is decreased. Therefore, it is possible to reduce the difference in thickness of the light bundle in the light modulation panel 60, and reduce the difference in luminance distribution in the display area SA of the light modulation panel 60 between the plurality of colored lights thus separated. Therefore, it is possible to provide the projector 1 in which the illumination variation can be reduced.

Further, according to this configuration, it is possible to achieve reduction of the illumination variation in the configuration of separating the light from the light source 10 two-dimensionally into four lights and then emitting the result. For example, in the case of setting the first colored light G to the colored light with the shortest light path length, and the fourth colored light Y to the colored light with the longest light path length, the fourth colored light with the longest light path length is reflected by the reflecting curved surface 43f and the reflecting curved surface 46f. The adjustment of the focal position of the light collection optical system 20 with respect to the fourth colored light Y is performed so as to be different from the focal position of the light collection optical system 20 with respect to the first colored light G. Thus, even if the focal position of the light collection optical system 20 with respect to the colored light (e.g., the green light G) with the shortest light path length is adjusted so that the part with the roughly uniform luminance distribution of the colored light (e.g., the green light G) with the shortest light path length roughly coincides with the display area SA of the light modulation panel, it is possible to arrange that the part with the uneven luminance distribution is not included in the display area SA of the light modulation panel regarding the colored light (e.g., the yellow light Y) with the longest light path length. Alternatively, it is possible to reduce the proportion of a part, which is included in the display area SA of the light modulation panel, in the part with the uneven luminance distribution. As described above, it is possible to reduce the difference between the area of the region with the roughly uniform luminance distribution of the colored light (e.g., the yellow light Y), which has the longest light path length, and with which the light modulation panel is irradiated, and the area of the display area SA of the light modulation panel. Therefore, it is possible to reduce the illumination variation.

Further, according to this configuration, since the projector 1 is configured including the two light bundle separation optical systems 41, 44, the configuration of the optical system becomes simple compared to the configuration including first through third light bundle separation optical systems. Therefore, downsizing and cost reduction of the projector 1 can be achieved.

Further, according to this configuration, the reduction in illumination variation can be realized with the configuration in which the first light bundle separation optical system 41 and the second light bundle separation optical system 44 each include two types of mirrors, namely the dichroic mirror and the reflecting mirror. Further, the configuration of the optical system becomes simple compared to the configuration in which the three light bundle separation optical systems each include two types of mirrors, namely the dichroic mirror and the reflecting mirror. Therefore, downsizing and cost reduction of the projector 1 can be achieved.

Further, according to this configuration, in the configuration of separating the light from the light source 10 two-dimensionally into four lights and then emitting the result, in the case of, for example, setting the first colored light G to the colored light with the shortest light path length and the fourth colored light Y to the colored light with the longest light path length, the fourth colored light Y with the longest light path length is reflected by the convex surface. The fourth colored light Y is reflected by the convex surface, and then the light bundle thereof is expanded compared to the one before entering the convex surface. Therefore, the size of the area of the light modulation panel 60 which is illuminated by the fourth colored light Y is increased. Therefore, even if the focal position of the light collection optical system 20 with respect to the colored light (e.g., the green light G) with the shortest light path length is adjusted so that the part with the roughly uniform luminance distribution of the colored light (e.g., the green light G) with the shortest light path length roughly coincides with the display area SA of the light modulation panel, it is possible to arrange that the part with the uneven luminance distribution is not included in the display area SA of the light modulation panel regarding the colored light (e.g., the yellow light Y) with the longest light path length using the reflecting curved surface 431 and the reflecting curved surface 461 each having the convex surface. Alternatively, it is possible to reduce the proportion of a part, which is included in the display area SA of the light modulation panel, in the part with the uneven luminance distribution. As described above, it is possible to reduce the difference between the area of the region with the roughly uniform luminance distribution of the colored light (e.g., the yellow light Y), which has the longest light path length, and with which the light modulation panel is irradiated, and the area of the display area SA of the light modulation panel.

Further, according to this configuration, each of the microlenses 61A constituting the microlens array 61 corresponds one-to-one to the pixel P composed of the four sub-pixels Pg, Pb, Pr, and Py. The colored light Lg, the colored light Lb, the colored light Lr, and the colored light Ly enter a predetermined microlens 61A in four directions, respectively, and are then converged by the microlens 61A, and then transmitted through the pixel of the light modulation panel 60 to thereby be modulated in accordance with the image signal. Therefore, the light efficiency can be improved.

Further, since the sub-pixels Pg, Pb, Pr, and Py are arranged in a 2×2 matrix, the angle formed between the optical axis of the microlens 61A and each of the colored lights entering the microlens 61A is reduced. Therefore, the aberration of the microlens 61A can be reduced.

It should be noted that although the projector 1 according to the present embodiment is configured including the two light bundle separation optical systems (the first light bundle separation optical system 41 and the second light bundle separation optical system 44), the configuration is not limited thereto. For example, the projector can also be configured including first through third light bundle separation optical systems.

In this case, as the first light bundle separation optical system, it is possible to adopt the configuration including the first dichroic mirror for reflecting the first light bundle and at the same time transmitting the second light bundle, and the first reflecting mirror for reflecting the second light bundle. As the second light bundle separation optical system, it is possible to adopt the configuration including the second dichroic mirror for reflecting the first colored light and at the same time transmitting the second colored light, and the second reflecting mirror for reflecting the second colored light. As the third light bundle separation optical system, it is possible to adopt the configuration including the third dichroic mirror for reflecting the third colored light and at the same time transmitting the fourth colored light, and the third reflecting mirror for reflecting the fourth colored light. Further, there is adopted the configuration of providing the reflecting curved surface to at least one of the first reflecting mirror through the third reflecting mirror.

According to this projector, the reduction in illumination variation can be realized with the configuration in which the first through third light bundle separation optical systems each include two types of mirrors, namely the dichroic mirror and the reflecting mirror.

Further, although in the projector 1 according to the present embodiment, the first dichroic mirror 42 corresponds to the mirror for reflecting the first light bundle (G+B) and at the same time transmitting the second light bundle (R+Y), and the second dichroic mirror 45 corresponds to the mirror for reflecting the green light G and the red light R and at the same time transmitting the blue light B and the yellow light Y, the projector 1 is not limited thereto. The spectral characteristics of each of the dichroic mirrors can arbitrarily be set in accordance with the arrangement state thereof and the setting state of the incident directions of the colored lights in the light modulation panel. For example, the first dichroic mirror 42 can also be a mirror for reflecting the second light bundle (R+Y) and at the same time transmitting the first light bundle (G+B). Further, the second dichroic mirror 45 can also be a mirror for reflecting the blue light B and the yellow light Y, and at the same time transmitting the green light G and the red light R.

Further, although in the projector 1 according to the present embodiment, both of the first reflecting mirror 43 and the second reflecting mirror 46 are provided with the reflecting curved surface, the projector 1 is not limited thereto. For example, the reflecting curved surface can also be provided only to the first reflecting mirror, or the reflecting curved surface can also be provided only to the second reflecting mirror. In other words, it is sufficient to provide the reflecting curved surface to at least one of the first reflecting mirror and the second reflecting mirror.

Figure 10:
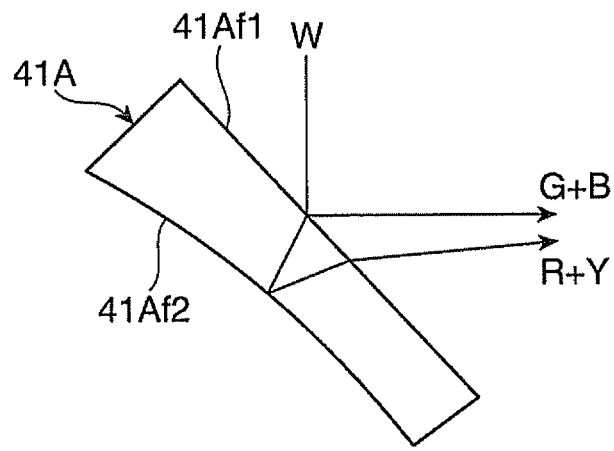
FIG. 10 is a schematic diagram showing a first modified example of a first light bundle separation optical system of the comparative example.

First Modified Example of First Light Bundle Separation Optical System According to First Embodiment FIG. 10 is a schematic diagram showing a first modified example of the first light bundle separation optical system according to the first embodiment.

As shown in FIG. 10, the first light bundle separation optical system of the present modified example is formed of a light bundle separation element 41A having a first principal surface 41Af1 and a second principal surface 41Af2 opposed to the first principal surface 41Af1. The constituents other than the first light bundle separation optical system are the same as the constituents shown in FIGS. 1A and 1B, and therefore the detailed explanation therefor will be omitted.

The light bundle separation element 41A of the present modified example separates the light W (the white light) emitted from the light source 10 into the first light bundle (G+B) including the first colored light (the green light G) and the second colored light (the blue light B), and the second light bundle (R+Y) including the third colored light (the red light R) and the fourth colored light (the yellow light Y).

Specifically, the first principal surface 41Af1 of the light bundle separation element 41A forms the surface for reflecting the first light bundle (G+B) and at the same time transmitting the second light bundle (R+Y). The second principal surface 41Af2 forms the surface for reflecting the second light bundle (R+Y). In the light bundle separation element 41A of the present modified example, the second principal surface 41Af2 functions as the reflecting curved surface for adjusting the focal position of the light collection optical system with respect to the colored light with the longest light path length between the light source 10 and the light modulation panel 60 using its own curvature. The second principal surface 41Af2 is formed of the reflecting curved surface having a convex surface on the entrance side of the second light bundle (R+Y).

According to the configuration of the present modified example, the first light bundle separation optical system is formed of a single light bundle separation element 41A. Therefore, it is possible to achieve space reduction of the optical system to thereby achieve downsizing of the projector.

Figure 11:
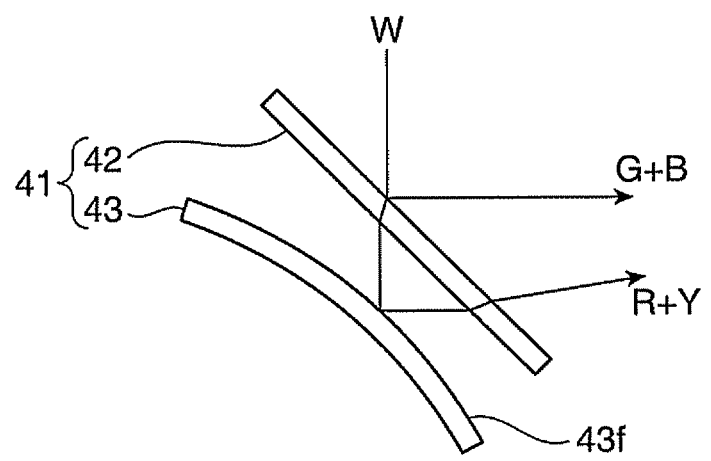
FIG. 11 is a schematic diagram showing a first light bundle separation optical system according to the first embodiment of the invention.

In contrast, in the case in which the first light bundle separation optical system is composed of two types of mirrors, namely the dichroic mirror and the reflecting mirror as shown in FIG. 11, the number of components increases. Further, in addition to the thickness of the dichroic mirror and the thickness of the reflecting mirror, the dichroic mirror and the reflecting mirror are disposed distantly by a predetermined distance from each other. Therefore, a large space is required.

Second Embodiment

Figure 12:
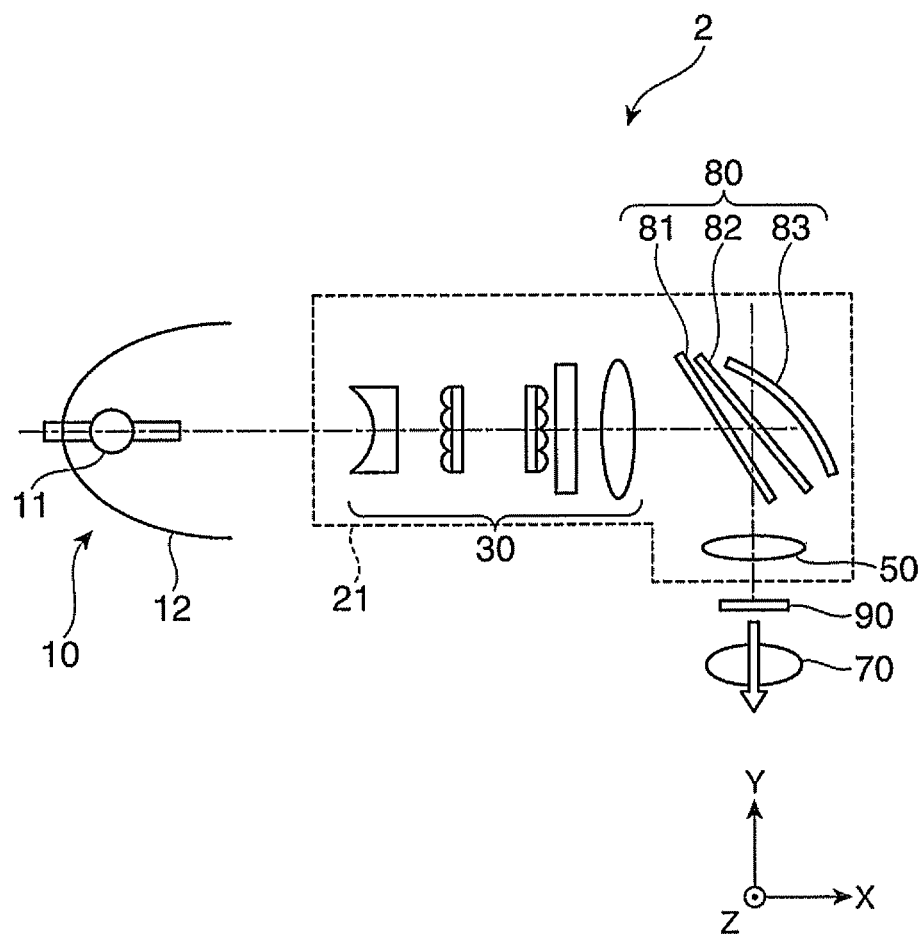
FIG. 12 is a schematic diagram showing a projector according to a second embodiment of the invention.

FIG. 12 is a schematic diagram corresponding to FIG. 1B, and showing a projector 2 according to a second embodiment of the invention.

As shown in FIG. 12, the projector 2 according to the present embodiment is different from the projector 1 according to the first embodiment described above in the point that a color separation optical system 80 for separating the light from the light source 10 one-dimensionally into three lights and then emitting the result is provided instead of the color separation optical system 40 for separating the light from the light source 10 two-dimensionally into four lights and then emitting the result, and the point that a light modulation panel 90 corresponding to the three-light separation is provided instead of the light modulation panel 60 corresponding to the four-light separation. Since the other points are substantially the same as those of the configuration described above, the elements substantially the same as those shown in FIG. 1B are denoted with the same reference symbols, and the detailed explanation therefor will be omitted.

As shown in FIG. 12, the projector 2 is provided with the light source 10 for emitting the light including visible light, a light collection optical system 21 for collecting the light emitted from the light source 10, the light modulation panel 90 for modulating the light collected by the light collection optical system 21, and the projection optical system (the projection lens) 70 for projecting colored lights generated by the light modulation panel 90 and including image information on a screen (not shown).

The light collection optical system 21 is provided with the polarization conversion optical system 30, a color separation optical system 80 for separating the light emitted from the polarization conversion optical system 30 into a plurality of types of colored light, and a field lens 50 for roughly collimating the colored lights from the color separation optical system 80 and then emitting the result.

The color separation optical system 80 is provided with a first dichroic mirror 81, a second dichroic mirror 82, and a reflecting mirror 83. The first dichroic mirror 81 is a mirror for reflecting first colored light (red light R) in the light W (the white light) emitted from the light source 10, and at the same time transmitting second colored light (green light G) and third colored light (blue light B). The second dichroic mirror 82 is a mirror for reflecting the second colored light (the green light G) and at the same time transmitting the third colored light (the blue light B). The reflecting mirror 83 is a mirror for reflecting the third colored light (the blue light B).

Although it is assumed here that the blue light B is the light in the wavelength band of about 380 nm through 520 nm, the green light G is the light in the wavelength band of about 520 nm through 600 nm, and the red light R is the light in the wavelength band of about 600 nm through 780 nm, the colored lights are not limited thereto.

In the present embodiment, the color separation optical system 80 separates the light from the light source 10 one-dimensionally into three lights. The light (the white light) emitted from the light source 10 is separated by the color separation optical system 80 into the first colored light R, the second colored light G, and the third colored light B.

Incidentally, in the configuration of separating the light from the light source one-dimensionally into three lights and then emitting the result, in the case of taking the focal position of the light collection optical system with respect to the colored light with the shortest light path length as the reference position, the focal position of the light collection optical system with respect to the colored light with the longest light path length is shifted from the reference position.

Figure 17A:
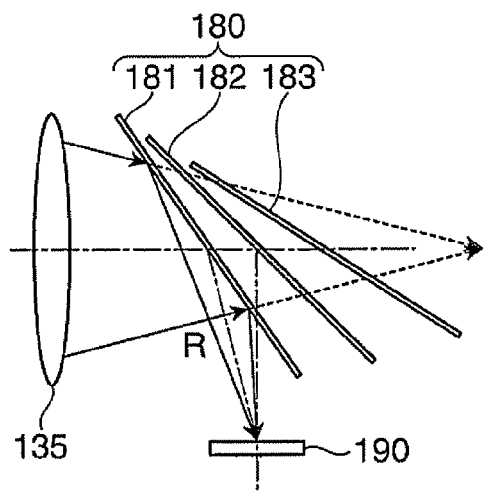
FIGS. 17A through 17C are schematic diagrams showing a color separation optical system of a comparative example.
Figure 17B:
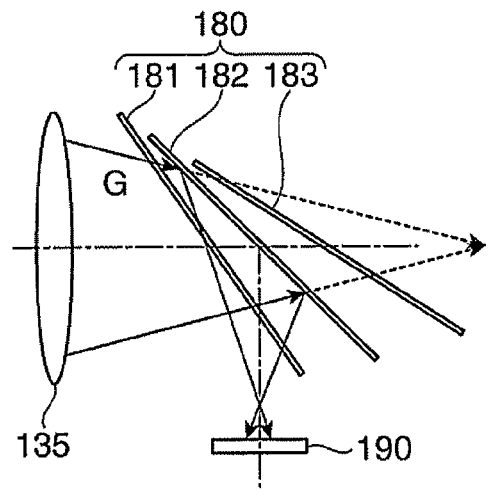
Figure 17C:
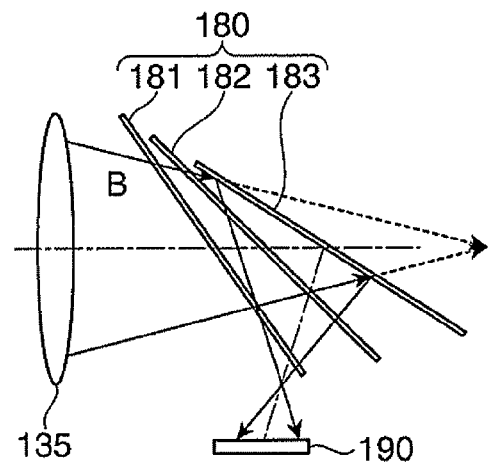

FIGS. 17A through 17C are schematic diagrams showing a color separation optical system 180 of a comparative example. FIG. 17A shows how the colored light with the shortest light path length is guided, FIG. 17C shows how the colored light with the longest light path length is guided, and FIG. 17B shows how the colored light with an intermediate light path length is guided. In FIGS. 17A through 17C, the reference numeral 135 denotes an overlapping lens, the reference numeral 181 denotes a first dichroic mirror, the reference numeral 182 denotes a second dichroic mirror, the reference numeral 183 denotes a reflecting mirror, and the reference numeral 190 denotes a light modulation panel.

As shown in FIG. 17A, the first dichroic mirror 181 is a mirror for reflecting the first colored light (the red light R), and at the same time transmitting the second colored light (the green light G) and the third colored light (the blue light B). As shown in FIG. 17B, the second dichroic mirror 182 is a mirror for reflecting the second colored light (the green light G) and at the same time transmitting the third colored light (the blue light B). As shown in FIG. 17C, the reflecting mirror 183 is a mirror for reflecting the third colored light (the blue light B).

As shown in FIGS. 17A through 17C, the light emitted from the light source (not shown) is separated by the color separation optical system 180 into the three types of colored light (the red light R, the green light G, and the blue light B), and then emitted toward the light modulation panel 190.

Among these three types of colored light, the colored light with the shortest light path length between the light source and the light modulation panel is the first colored light R (the colored light not transmitted through the first dichroic mirror 181) reflected by the first dichroic mirror 181. In contrast, the colored light with the longest light path length between the light source and the light modulation panel is the third colored light B (the colored light transmitted through the first dichroic mirror 181 and the second dichroic mirror 182) reflected by the reflecting mirror 183.

Figure 18A:
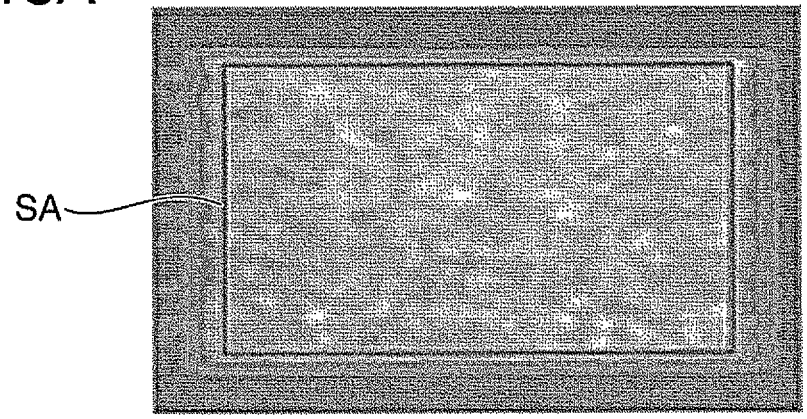
FIGS. 18A through 18C are diagrams showing an illumination area with respect to a light modulation panel when using the color separation optical system of the comparative example.
Figure 18B:
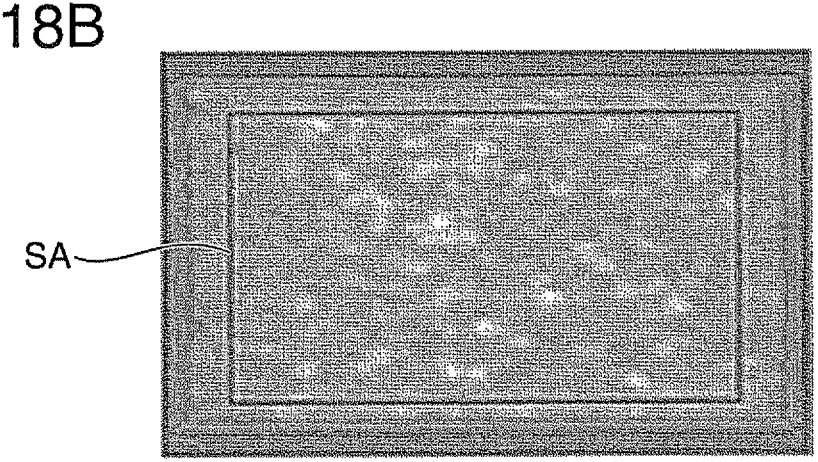
Figure 18C:
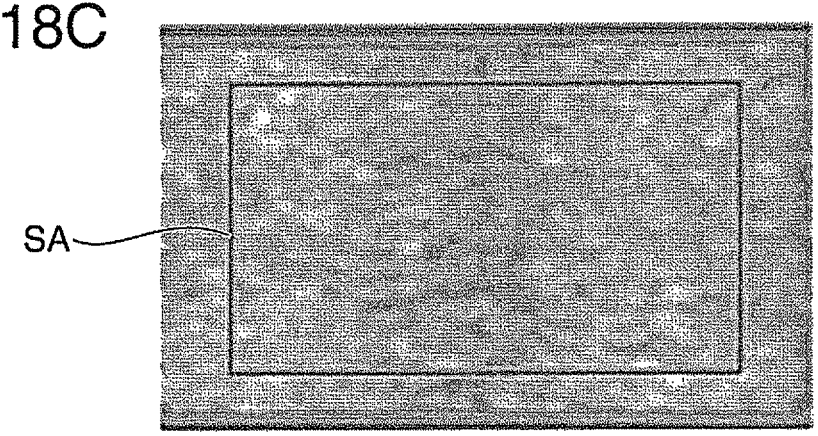

FIGS. 18A through 18C are diagrams showing an illumination area with respect to the light modulation panel when using the color separation optical system 180 of the comparative example. FIGS. 18A through 18C show the difference in illumination margin due to the difference in the light path length, wherein FIG. 18A shows the illumination area of the colored light (e.g., the first colored light R) with the shortest light path length, FIG. 18B shows the illumination area of the colored light (e.g., the second colored light G) with an intermediate light path length, and FIG. 18C shows the illumination area of the colored light (e.g., the third colored light B) with the longest light path length. In FIGS. 18A through 18C, the reference symbol SA denotes the display area of the light modulation panel.

Figure 19A:
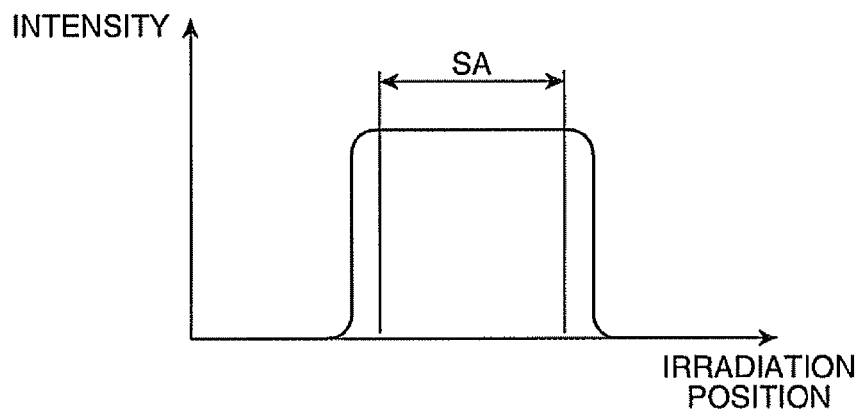
FIGS. 19A through 19O are diagrams showing the light intensity distributions of the light emitted from the color separation optical system of the comparative example.
Figure 19B:
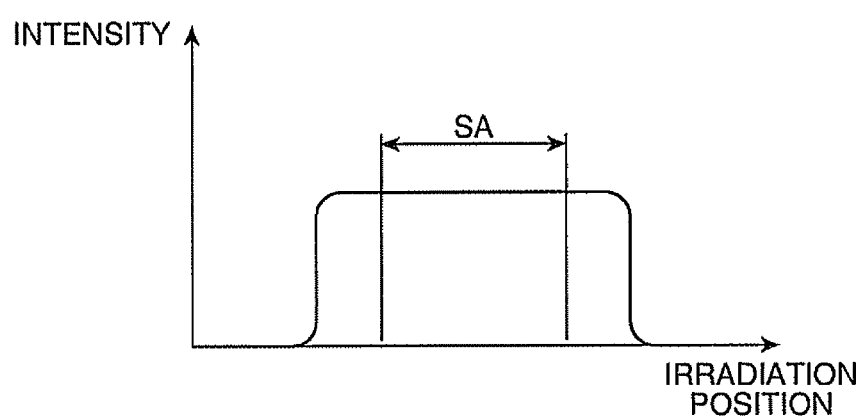
Figure 19C:
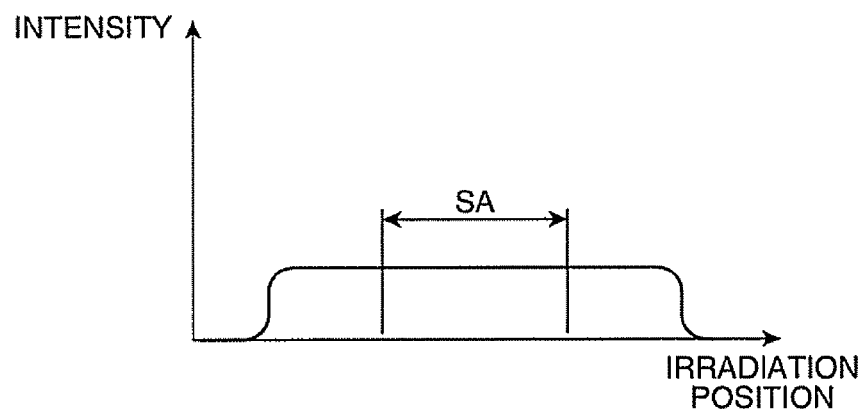

FIGS. 19A through 19C are diagrams showing the light intensity distributions of the light emitted from the color separation optical system 180 of the comparative example. FIG. 19A corresponds to the light intensity distribution of the colored light (e.g., the first colored light R) with the shortest light path length, FIG. 19B corresponds to the light intensity distribution of the colored light (e.g., the second colored light G) with an intermediate light path length, and FIG. 19C corresponds to the light intensity distribution of the colored light (e.g., the third colored light B) with the longest light path length.

As shown in FIG. 18A, it is assumed that the focal position of the light collection optical system 21 with respect to the first colored light R is adjusted so that the display area SA of the light modulation panel roughly coincides with the part where no variation occurs in the luminance distribution of the colored light (e.g., the first colored light R) with the shortest light path length. The part where no variation occurs in the luminance distribution of the light denotes the part with the roughly uniform luminance distribution of the light.

As shown in FIG. 19A, the luminance distribution of the colored light (e.g., the first colored light R) with the shortest light path length has the top-hat shape. The flat portion at the top of the top-hat shape has the roughly uniform intensity distribution (luminance distribution). Regarding the colored light (e.g., the first colored light R) with the shortest light path length, the display area SA of the light modulation panel roughly coincides with the part where no variation occurs in the luminance distribution of the colored light (e.g., the first colored light R) with the shortest light path length, and the part with the uneven luminance distribution is not included in the display area SA.

As shown in FIG. 18B, regarding the colored light (e.g., the second colored light G) with an intermediate light path length, although the part with the roughly uniform luminance distribution is partially included in the display area SA of the light modulation panel, a part of the part with the roughly uniform luminance distribution protrudes from the display area SA.

As shown in FIG. 19B, the luminance distribution of the colored light (e.g., the second colored light G) with an intermediate light path length has the shape with a larger flat part at the top compared to the top-hat shape shown in FIG. 19A. However, the intensity of the flat part is lower compared to the intensity of the flat part in the top-hat shape shown in FIG. 19A.

Further, regarding the colored light (e.g., the second colored light G) with an intermediate light path length, although the part with the roughly uniform luminance distribution is partially included in the display area SA, a part of the part with the roughly uniform luminance distribution protrudes from the display area SA. Thus, the proportion of the part with the roughly uniform luminance distribution included in the display area SA is lower compared to the top-hat shape shown in FIG. 19A.

As shown in FIG. 18C, regarding the colored light (e.g., the third colored light B) with the longest light path length, although the part with the roughly uniform luminance distribution is partially included in the display area SA of the light modulation panel, a part of the part with the roughly uniform luminance distribution protrudes from the display area SA. It should be noted that the proportion of the protrusion is the highest of the three types of colored light.

As shown in FIG. 19C, the luminance distribution of the colored light (e.g., the third colored light B) with the longest light path length has the shape with a larger flat part at the top compared to the top-hat shape shown in FIG. 19B. However, the intensity of the flat part is lower compared to the intensity of the flat part in the top-hat shape shown in FIG. 19B.

Further, regarding the colored light (e.g., the third colored light B) with the longest light path length, although the part with the roughly uniform luminance distribution is partially included in the display area SA, a part of the part with the roughly uniform luminance distribution protrudes from the display area SA. Thus, the proportion of the part with the roughly uniform luminance distribution included in the display area SA is lower compared to the top-hat shape shown in FIG. 19B. It should be noted that the proportion of the protrusion is the highest of the three types of colored light.

As described above, in the case of using the color separation optical system 180 of the comparative example, if the focal position of the light collection optical system 21 with respect to the colored light (e.g., the first colored light R) with the shortest light path length is adjusted so that the part with the roughly uniform luminance distribution of the colored light (e.g., the first colored light R) with the shortest light path length roughly coincides with the display area SA of the light modulation panel, the part with the roughly uniform luminance distribution significantly protrudes from the display area SA of the light modulation panel regarding in particular the colored light (e.g., the third colored light B) with the longest light path length due to the difference in illumination margin caused by the difference in the light path length. Therefore, not only that the protrusion causes the loss in taking out the light, but there arises such a difference in brightness (the illumination variation) of the display area SA of the light modulation panel that the display area SA is brighter with the first colored light R but is darker with the third colored light B.

Therefore, in the present embodiment, a reflecting curved surface is disposed in the light path of at least the colored light with the longest light path length between the light source and the light modulation panel out of the plurality of types of colored light. The reflecting curved surface adjusts the focal position of the light collection optical system with respect to the colored light using the curvature of itself.

Figure 13:
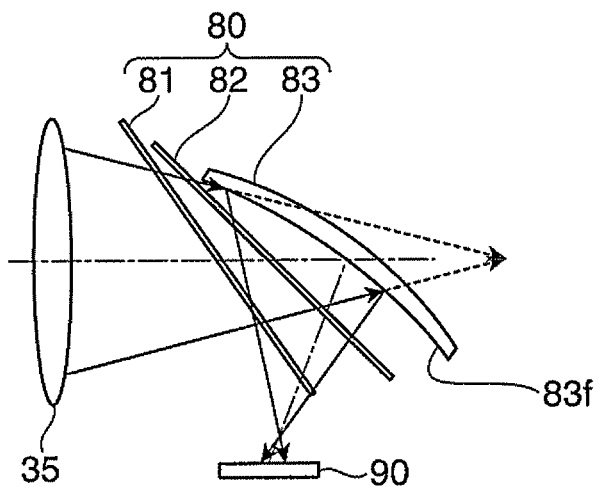
FIG. 13 is a schematic diagram showing a color separation optical system of the second embodiment.

Specifically, as shown in FIG. 13, in the color separation optical system 80, a reflecting curved surface 83f is disposed in the light path of the colored light (e.g., the third colored light B) with the longest light path length between the light source 10 and the light modulation panel 90 out of the first colored light R, the second colored light G, and the third colored light B.

The reflecting curved surface 83f has a function of adjusting the area of the illumination area. Specifically, the reflecting curved surface 83f has a function of reducing the difference between the area of the region with the roughly uniform luminance distribution of the colored light (e.g., the third colored light B), which has the longest light path length, and with which the light modulation panel is irradiated, and the area of the display area SA of the light modulation panel. Thus, the difference in brightness between the colors can be reduced.

In the present embodiment, the reflecting mirror 83 is provided with the reflecting curved surface 83f. The reflecting curved surface 83f of the reflecting mirror 83 has a concave surface on the side of reflecting the light.

Figure 15:
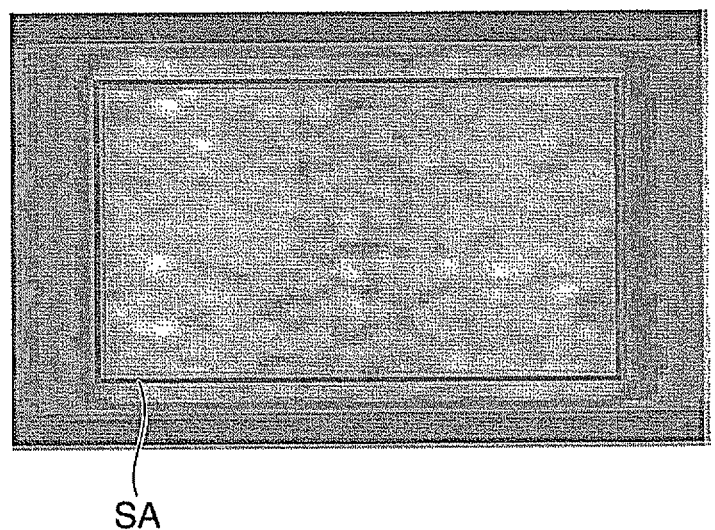
FIG. 15 is a diagram showing an illumination area with respect to a light modulation panel when using the color separation optical system of the second embodiment.

FIG. 15 is a diagram showing an illumination area with respect to the light modulation panel when using the color separation optical system 80 of the present embodiment. FIG. 15 shows the illumination area of the colored light (e.g., the third colored light B) with the longest light path length corresponding to FIG. 18C. In FIG. 15, the reference symbol SA denotes the display area of the light modulation panel.

Figure 16:
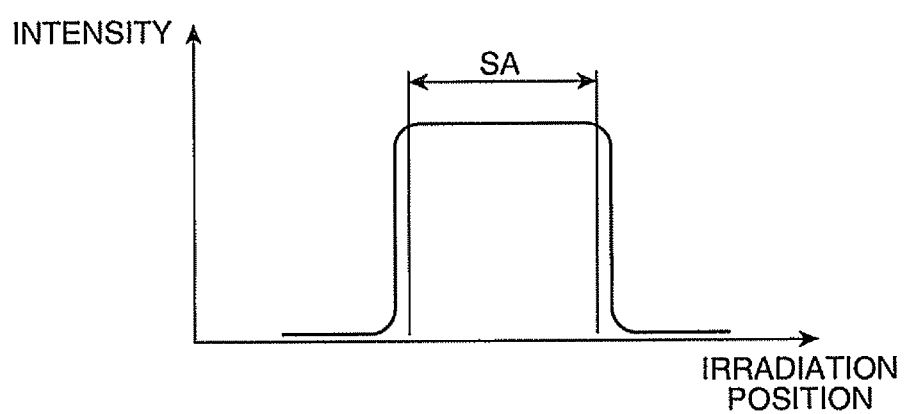
FIG. 16 is a diagram showing the light intensity distribution of the light emitted from the color separation optical system of the second embodiment.

FIG. 16 is a diagram showing the light intensity distribution of the light emitted from the color separation optical system 80 of the present embodiment. FIG. 16 shows the light intensity distribution of the colored light (e.g., the third colored light B) with the longest light path length corresponding to FIG. 19C.

In the case of using the color separation optical system 80 of the present embodiment, as shown in FIG. 15, it is possible to make the part with the roughly uniform luminance distribution of the colored light (e.g., the third colored light B) with the longest light path length coincide with the display area SA of the light modulation panel. In the present embodiment, the third colored light B with the longest light path length is reflected by the reflecting curved surface 83f. The adjustment of the focal position of the light collection optical system with respect to the third colored light B is performed so as to roughly coincide with the focal position of the light collection optical system with respect to the first colored light R with the shortest light path length. Specifically, the light bundle is reflected by the reflecting curved surface formed of a concave surface to thereby be converged. Therefore, the light bundle of the third colored light B is converged by reflecting the third colored light B by the reflecting curved surface 83f. Therefore, the size of the area of the light modulation panel which is illuminated by the third colored light B is decreased. By appropriately adjusting the curvature of the reflecting curved surface 83f, it is possible to make the adjustment so that the part with the roughly uniform illumination distribution of the colored light (e.g., the third colored light B) with the longest light path length is entirely included in the display area SA. Alternatively, it is possible to reduce the proportion of the part protruding from the display area SA out of the part with the roughly uniform luminance distribution of the colored light (the third colored light B) with the longest light path length. As described above, it is possible to reduce the difference between the area of the region with the roughly uniform luminance distribution of the colored light (e.g., the third colored light B), which has the longest light path length, and with which the light modulation panel is irradiated, and the area of the display area SA of the light modulation panel.

As shown in FIG. 16, the luminance distribution of the colored light (e.g., the third colored light B) with the longest light path length has the top-hat shape similar to the shape shown in FIG. 19A. In other words, the flat part at the top is smaller compared to the shape shown in FIG. 19C. Regarding the colored light (e.g., the third colored light B) with the longest light path length, the part with the roughly uniform luminance distribution roughly coincides with the display area SA, and the part with the uneven luminance distribution is not included in the display area SA.

As described above, in the case of using the color separation optical system 80 of the present embodiment, even if the focal position of the light collection optical system 21 with respect to the colored light (e.g., the first colored light R) with the shortest light path length is set so that the part with the roughly uniform luminance distribution of the colored light (e.g., the first colored light R) with the shortest light path length roughly coincides with the display area SA of the light modulation panel, the part with the roughly uniform luminance distribution does not protrude from the display area SA regarding the colored light (e.g., the third colored light B) with the longest light path length. Alternatively, it is possible to reduce the proportion of the part protruding from the display area SA out of the part with the roughly uniform luminance distribution of the colored light (the third colored light B) with the longest light path length. As described above, it is possible to reduce the difference between the area of the region with the roughly uniform luminance distribution of the colored light (e.g., the third colored light B), which has the longest light path length, and with which the light modulation panel is irradiated, and the area of the display area SA of the light modulation panel. Therefore, it is possible to prevent the loss in taking out the light, and at the same time, to reduce the difference in brightness between the first colored light R, the second colored light G, and the third colored light B in the display area SA of the light modulation panel.

Figure 14A:
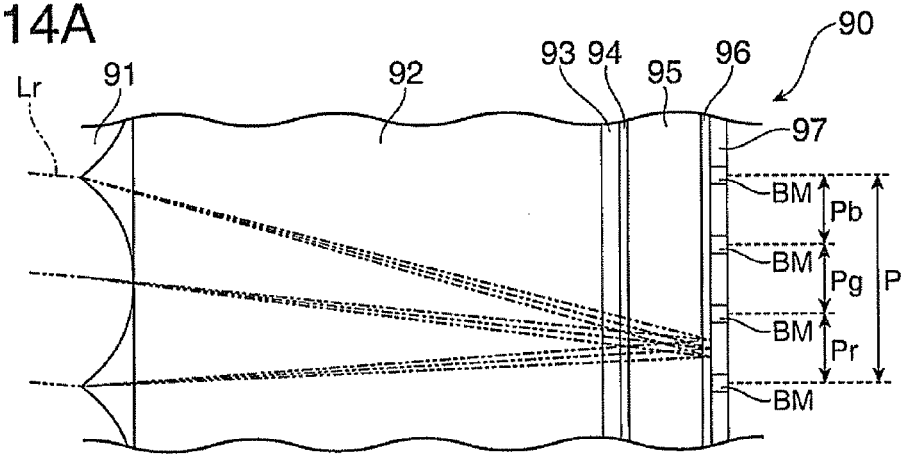
FIGS. 14A through 14C are diagrams for explaining the correspondence relationship between a microlens and sub-pixels in the second embodiment.
Figure 14B:
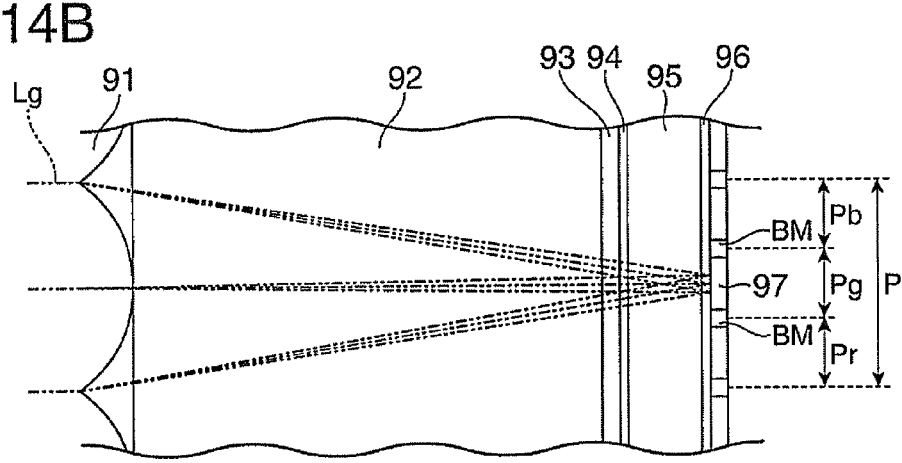
Figure 14C:
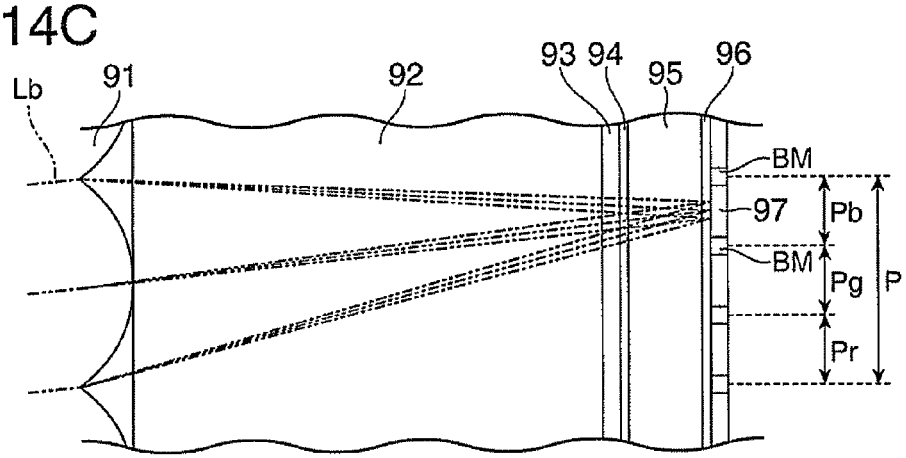

FIGS. 14A through 14C are diagrams for explaining the correspondence relationship between a microlens and sub-pixels in the present embodiment. In FIGS. 14A through 14C, how the first colored light R out of the three types of colored light is guided is shown in FIG. 14A, how the second colored light G is guided is shown in FIG. 14B, and how the third colored light B is guided is shown in FIG. 14C for the sake of convenience. In FIG. 14A, the reference symbol Lr denotes the incident light axis of the first colored light R to the red sub-pixel Pr. In FIG. 14B, the reference symbol Lg denotes the incident light axis of the second colored light G to the green sub-pixel Pg. In FIG. 14C, the reference symbol Lb denotes the incident light axis of the third colored light B to the blue sub-pixel Pb. It should be noted that although the light modulation panel 90 is provided with a number of pixels, FIGS. 14A through 14C show one of the number of pixels in an enlarged manner. The light modulation panel 90 is, for example, a liquid crystal panel.

As shown in FIGS. 14A through 14C, the pixel P of the light modulation panel 90 is composed of the sub-pixel Pr for emitting the red light, the sub-pixel Pg for emitting the green light, and the sub-pixel Pb for emitting the blue light. The area overlapping each of the sub-pixels Pr, Pg, and Pb is provided with a pixel electrode 97. The area overlapping a plurality of pixels P is provided with a common electrode 93.

The pixel electrode 97 has an island shape, and a light blocking section BM is disposed between the pixel electrodes 97. A switching element (not shown) is electrically connected to each of the pixel electrodes 97, and the switching element is electrically connected to a signal source (not shown). The switching element is disposed in an area overlapping the light blocking section BM. It is arranged that the signal source supplies the switching element with a video signal and a control signal, and the switching element switches the video signal based on the control signal to thereby transmit the video signal to the pixel electrode 97.

Between the pixel electrode 97 and the common electrode 93 there is disposed a liquid crystal layer 95. Between the liquid crystal layer 95 and the pixel electrodes 97 there is disposed an oriented film 96 for controlling the orientational state of the liquid crystal layer. Between the liquid crystal layer 95 and the common electrode 93 there is disposed an oriented film 94 for controlling the orientational state of the liquid crystal layer. The light modulation panel 90 of the present embodiment is arranged so that the light enters the liquid crystal layer 95 from the common electrode 93 side.

The common electrode 93 is provided with a transparent substrate 92 disposed on the opposite side to the liquid crystal layer 95. The transparent substrate 92 is provided with a microlens array 91 disposed on the opposite side to the liquid crystal layer 95. The microlens array 91 is provided with an entrance side polarization element (not shown) disposed on the opposite side to the liquid crystal layer 95. The pixel electrode 97 is provided with an exit side polarization element (not shown) disposed on the opposite side to the liquid crystal layer 95. The entrance side and exit side polarization elements are each formed of a wire-grid polarization element, a polarization plate, or the like.

The light having entered the light modulation panel 90 has the polarization component in a predetermined direction converted into a linearly-polarized light while passing through the entrance side polarization element, and enters the microlens array 91. The microlens array 91 has a plurality of microlenses. The microlens array 91 is configured so that one microlense corresponds to three sub-pixels. In other words, each of the plurality of microlenses is disposed so as to overlap each of the plurality of pixels P. The wavelength lights Lr, Lg, and Lb having entered the microlens are collected to respective focal points different between the wavelengths since the light axes of the lights with the respective wavelengths different from each other are nonparallel to each other.

As shown in FIG. 14A, the red light Lr is collected by the microlens so as to pass through the part of the liquid crystal layer 95 overlapping the sub-pixel Pr. The red light Lr is arranged to have the diffusion angle of about ±3° in either of the component passing through the central portion and the component passing through the edge portion of the microlens. Similarly, the green light Lg is collected so as to pass through the part of the liquid crystal layer 95 overlapping the sub-pixel Pg (see FIG. 14B), and the blue light Lb is collected so as to pass through the part of the liquid crystal layer 95 overlapping the sub-pixel Pb (see FIG. 14C).

Incidentally, when the video signal is transmitted to each of the plurality of pixel electrodes 97, an electrical field is applied between the pixel electrode 97 and the common electrode 93 for each of the sub-pixels. Due to the electrical field, the azimuth angle of the liquid crystal molecules of the liquid crystal layer 95 is controlled for each of the sub-pixels, and the polarization state of the light passing through the liquid crystal layer 95 varies sub-pixel by sub-pixel. The red light Lr having passed through the part of the liquid crystal layer 95 overlapping the sub-pixel Pr is varied in the polarization state, and then the polarization component with a predetermined direction of the red light Lr passes through the exit side polarization element, and thus the red light Lr becomes the light with the grayscale level corresponding to the video signal.

In a similar manner, the green light Lg having passed through the part of the liquid crystal layer 95 overlapping the sub-pixel Pg, and the blue light Lb having passed through the part of the liquid crystal layer 95 overlapping the sub-pixel Pb also become the lights with the grayscale levels corresponding to the video signal, respectively. As described above, the red light Lr, the green light Lg, and the blue light Lb thus modulated are emitted from the light modulation panel 90. The lights emitted from the light modulation panel 90 are projected on a screen (not shown) by the projection lens 70 shown in FIG. 12 in an enlarged manner.

Further, according to the projector 2 of the present embodiment, it is possible to achieve reduction of the illumination variation in the configuration of separating the light from the light source 10 one-dimensionally into three lights and then emitting the result. For example, in the case of setting the first colored light to the red light R, the second colored light to the green light G, and the third colored light to the blue light B, the blue light B with the longest light path length is reflected by the reflecting curved surface 83*f*. The adjustment of the focal position of the light collection optical system 21 with respect to the blue light B is performed so as to be roughly the same as the focal position of the light collection optical system 21 with respect to the red light R with the shortest light path length. Thus, the difference in illumination intensity between the blue light B and the red light R caused by the difference in light path length between the blue light B and the red light R can be reduced. Therefore, it is possible to reduce the illumination variation between the colors.

Further, according to this configuration, the third colored light with the longest light pass length is reflected by the reflecting curved surface 83*f* having the concave surface in the configuration of separating the light from the light source 10 one-dimensionally into the three lights and then emitting the result. The third colored light is converged in the light bundle after being reflected by the reflecting curved surface 83*f* having the concave surface compared to the state before entering the reflecting curved surface 83*f* having the concave surface. Therefore, the size of the area of the light modulation panel 90 which is illuminated by the third colored light is decreased. Even in the case of adjusting the focal position of the light collection optical system 21 with respect to the first colored light so that the part with the roughly uniform luminance distribution of the first colored light with the shortest light path length roughly coincides with the display area SA, by appropriately setting the curvature of the reflecting curved surface 83*f*, it is possible to make the part with the roughly uniform luminance distribution of the third colored light with the longest light path length roughly coincide with the display area SA. As described above, it is possible to reduce the difference between the area of the region with the roughly uniform luminance distribution of the colored light (e.g., the third colored light B), which has the longest light path length, and with which the light modulation panel is irradiated, and the area of the display area SA of the light modulation panel. In such a manner as described above, it is possible to reduce the illumination variation between the colors.

Further, according to this configuration, one microlense constituting the microlens array 91 corresponds one-to-one to the three sub-pixels Pr, Pg, and Pb constituting the pixel P. The light separated one-dimensionally into the three lights and then emitted enters a predetermined microlens in three directions, and is then converged by the microlens, and then transmitted through the pixel P of the light modulation panel 90 to thereby be modulated in accordance with the image signal. Therefore, the light efficiency can be improved.

It should be noted that although the transmissive liquid crystal panel (light valve) is used as the light modulation panel in each of the embodiments described above, the reflective liquid crystal panel can also be used. Further, it is also possible to use a reflective light modulation device (mirror modulator) such as Digital Micromirror Device™ (DMD).

The invention can be applied to a front projection projector for performing projection from the side of observing the projection image, and also to a rear projection projector for performing projection from the side opposite to the side of observing the projection image.

The entire disclosure of Japanese Patent Application No. 2011-169265, filed on Aug. 2, 2011 is expressly incorporated by reference herein.

What is claimed is:

1. A projector comprising:
   a light source;
   a light collection optical system adapted to collect light emitted from the light source; and
   a light modulation panel adapted to modulate the light collected by the light collection optical system,
   wherein the light collection optical system includes a color separation optical system adapted to separate the light emitted from the light source into a plurality of types of colored light,
   a reflecting curved surface is disposed in at least a light path of the colored light with the longest light path length between the light source and the light modulation panel out of the plurality of types of colored light,
   a dichroic mirror that transmits the colored light with the longest light path length to the reflecting curved surface, and that again transmits the colored light with the longest light path length after the reflecting curved surface reflects the colored light with the longest light path length, and
   wherein the light modulation panel modulates the plurality of colored lights.

2. The projector according to claim 1, wherein the color separation optical system includes
   a first light bundle separation optical system adapted to separate the light emitted from the light source into a first light bundle including a first colored light and a second colored light, and a second light bundle including a third colored light and a fourth colored light,
   a second light bundle separation optical system adapted to separate the first light bundle into the first colored light and the second colored light, and emit the first colored light and the second colored light in respective directions intersecting with a plane including a light axis of the light emitted from the light source and a light axis of the first light bundle, and a third light bundle separation optical system adapted to separate the second light bundle into the third colored light and the fourth colored light, and emit the third colored light and the fourth colored light in respective directions intersecting with the plane, and the reflecting curved surface is disposed in the light path of the colored light with the longest light path length between the light source and the light modulation panel out of the first colored light through the fourth colored light.

3. The projector according to claim 2, wherein
the first light bundle separation optical system includes a first dichroic mirror adapted to reflect the first light bundle, and transmit the second light bundle, and a first reflecting mirror adapted to reflect the second light bundle,
the second light bundle separation optical system includes a second dichroic mirror adapted to reflect the first colored light, and transmit the second colored light, and a second reflecting mirror adapted to reflect the second colored light,
the third light bundle separation optical system includes a third dichroic mirror adapted to reflect the third colored light, and transmit the fourth colored light, and a third reflecting mirror adapted to reflect the fourth colored light, and
at least one of the first reflecting mirror through the third reflecting mirror is the reflecting curved surface.

4. The projector according to claim 1, wherein
the color separation optical system includes
a first light bundle separation optical system adapted to separate the light emitted from the light source into a first light bundle including first colored light and second colored light, and a second light bundle including third colored light and fourth colored light, and
a second light bundle separation optical system adapted to separate the first light bundle into the first colored light and the second colored light, separate the second light bundle into the third colored light and the fourth colored light, and emit the first colored light, the second colored light, the third colored light, and the fourth colored light in respective directions intersecting with a plane including a light axis of the light emitted from the light source and a light axis of the first light bundle, and
the reflecting curved surface is disposed in the light path of the colored light with the longest light path length between the light source and the light modulation panel out of the first colored light through the fourth colored light.

5. The projector according to claim 4, wherein
the first light bundle separation optical system includes a first dichroic mirror adapted to reflect the first light bundle, and transmit the second light bundle, and a first reflecting mirror adapted to reflect the second light bundle,
the second light bundle separation optical system includes a second dichroic mirror adapted to reflect the first colored light and the third colored light, and transmit the second colored light and the fourth colored light, and a second reflecting mirror adapted to reflect the second colored light and the fourth colored light, and
at least one of the first reflecting mirror and the second reflecting mirror is the reflecting curved surface.

6. The projector according to claim 2, wherein
the first light bundle separation optical system includes a light bundle separation element having a first principal surface and a second principal surface opposed to the first principal surface,
the first principal surface reflects the first light bundle and transmits the second light bundle, and the second principal surface reflects the second light bundle, and
the second principal surface is the reflecting curved surface.

7. The projector according to claim 2, wherein
the reflecting curved surface is a convex reflecting curved surface.

8. The projector according to claim 2, wherein
the light modulation panel has at least one pixel composed of a plurality of sub-pixels,
the light modulation panel is provided with a microlens array disposed on an entrance side of the plurality of types of colored light, and
the microlens array is configured so that one microlense constituting the microlens array corresponds to four of the sub-pixels arranged in a 2×2 matrix.

9. The projector according to claim 1, wherein
the color separation optical system includes
a first dichroic mirror adapted to reflect a first colored light, and transmit a second colored light and a third colored light out of the light emitted from the light source,
a second dichroic mirror adapted to reflect the second colored light, and transmit the third colored light, and
a reflecting surface adapted to reflect the third colored light, and
the reflecting surface is the reflecting curved surface.

10. The projector according to claim 9, wherein
the reflecting curved surface is a concave reflecting curved surface.

11. The projector according to claim 9, wherein
the light modulation panel has at least one pixel composed of a plurality of sub-pixels,
the light modulation panel is provided with a microlens array disposed on an entrance side of the plurality of types of colored light, and
the microlens array is configured so that one microlense constituting the microlens array corresponds to three of the sub-pixels.

12. The projector according to claim 1, wherein the reflecting curved surface reflects only some of the plurality of types of colored light.

* * * * *